United States Patent
Fadavi-Ardekani et al.

(10) Patent No.: US 6,230,215 B1
(45) Date of Patent: May 8, 2001

(54) ON-DEMAND TRANSFER ENGINE

(75) Inventors: Jalil Fadavi-Ardekani, Orefield; Srinivasa Gutta, Allentown, both of PA (US); Walter G. Soto, Irvine, CA (US); Avinash Velingker, Orefield, PA (US); Daniel K. Greenwood, Red Bank, NJ (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/188,904

(22) Filed: Nov. 10, 1998

Related U.S. Application Data

(60) Provisional application No. 60/065,855, filed on Nov. 14, 1997.

(51) Int. Cl.[7] .................................................. G06F 3/00
(52) U.S. Cl. ................................ 710/1; 710/21; 710/22; 710/33
(58) Field of Search .................................. 710/1, 21, 22, 710/33, 34, 35

(56) References Cited

U.S. PATENT DOCUMENTS

| | | | | |
|---|---|---|---|---|
| 5,555,390 | * | 9/1996 | Judd et al. | 395/434 |
| 5,594,927 | * | 1/1997 | Lee et al. | 398/886 |
| 5,794,069 | * | 8/1998 | Chisholm et al. | 395/522 |

* cited by examiner

Primary Examiner—Robert Beausoleil
Assistant Examiner—Xuong Chung-Trans
(74) Attorney, Agent, or Firm—William H. Bollman

(57) ABSTRACT

An on-demand transfer (ODT) engine is located in each peripheral in a host/peripheral system communicating using a burst mode bus, e.g., a PCI bus. Each peripheral transfers blocks by setting, e.g., a starting address and block size of a data block to be transferred. Importantly, the starting location of a data transfer stream is maintained in a common memory area, e.g., in the host, while the length of the data transfer block is maintained in the ODT engine. By maintaining the length of the data block in the ODT engine, the peripheral can change the length of a block in a continual data stream on the fly, without the need to communicate with the host computer or common data transfer device such as a DMA. In the disclosed embodiment, up to 128 data streams may be simultaneously transferred.

22 Claims, 37 Drawing Sheets

DYNAMIC STREAM INTERRUPT QUEUE

*FIG. 3A(1)*

Current Host "Host Stream Interrupt Queue" Pointer (CHHP) Register

| Add | Mode | Bits | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 6EH | R/W | Field | Reserved | | | | | | | | Current Host HSIQ Pointer | | | | | | | |

| Bits | Field | Description |
|---|---|---|
| 15-8 | Reserved | Reserved |
| 7-0 | Current Host HSIQ Pointer | The CHHP pointer will be updated by the HOST to point to the next location in the HSIQ, after the HOST has serviced the current interrupt in the Host Stream Interrupt Queue. This pointer can be viewed as a water mark indicating the ODT where in the HSIQ the host is pointing to. When the ODT is making entries into the HSIQ and the HOST cannot keep up with the servicing of the interrupts, the HSIQ will be filled up and this condition is indicated when the CHHP pointer is pointing to the current HSIQ pointer of the ODT. This is a HIS Queue full condition and will be indicated to the HOST through the ODT EMERGENCY STOP interrupt and the "R" bit of the Register H.0X6D will be set.<br><br>Upon ODT initialization this pointer should be pointing to the last location in the queue, indicating the entire queue is empty. The pointer provides an advantage to the HOST ISR that it can service as many interrupts as possible when invoked and before exiting, the ISR can update the CHHP to point to the next location that needs servicing. The CHHP pointer is a word aligned pointer.<br>= 0 (Default), CHHP pointer not initialized.<br>= X, CHHP pointer updated by host to point to the next location in the HSIQ. |

32 BIT STREAM POINTERS

DATA STREAM CYCLIC BUFFERS

STREAM DATA STORAGE

FIG. 7A(1A)

ODT System Control Register (SCR)

| Add | Mode | Bits | 15 | 14 | 13 | 12 | 11 | 10 | 9 | 8 | 7 | 6 | 5 | 4 | 3 | 2 | 1 | 0 |
|-----|------|------|----|----|----|----|----|----|----|----|----|----|----|----|----|----|----|----|
| 63H | R | Field | TEN | TAB | CCI | CE | | | | | PCI Clock Count | | | | | | | |

| Bits | Field | Description |
|------|-------|-------------|
| 15 | T-EN | This "Timer Enable" bit uesd by ODT to allow one of two timers to set the "Go" bit which initiates a search of the stream request queue. Once enabled, the Timer A or B will generate the "Go" bit setting at a fixed interval determined by how the Timer is configured.<br>= 0 (Default), Timer selection not enabled.<br>= 1, Timer enabled and when time-out condition occurs ODT's "Go" bit will be set. ODT will clear "Go" bit after one complete pass of the Stream Request Queue. |
| 14 | T-AB | This "Timer A or B" selection bit is used to select one of the two CAMIL-L Timers A or B which will set ODT's "Go" bit.<br>= 0 (Default), CAMIL-L's Timer-A Selected.<br>= 1, CAMIL-L's Timer-B Selected. |
| 13 | CCI (PCI Clock Count Interrupt) | When the PCI Clock Counter is done counting bus master clocks due to the end of a bus master access, this bit will cause a maskable ODT DIAGNOSTIC interrupt, to HOST, and the mask control is done via write to the bit. Interrupt is cleared by HOST reading this SCR register. Reads<br>= 0 (Default), CCI Interrupt is not active.<br>= 1, CCI Interrupt is active. |
| 12 | CE (Counter Enable) | Enable bit for ODT's counter that counts total number of PCI bus clocks during an ODT transfer session. This count includes PCI latency time out or premature termination of PCI bus acquisition.<br>= 0 (Default), ODT counter is inactive and consuming no power.<br>= 1, ODT counter is active. |

*FIG. 7A(1B)*

| 11–0 | PCI Clock Count | PCI bus clock count during the entire ODT PCI bus request, acquisition, and completion or termination. This 12bit counter is intended to be used during diagnostic type software to determine performance characteristics of a given HOST PC system. HOST diagnostic information could determine statistical information for minimum, typical and maximum PCI bus latencies and PCI bus clock count per DWORD transfers. When counter has stopped (i.e. ODT no longer has ownership of PCI bus via LuPCI interface), an ODT DIAGNOSTIC interrupt is generated and the interrupt is cleared by the read of this register. ODT will wait for interrupt to be cleared before starting a new bus master session.<br>= 0 (Default), Counter Inactive and in power saving mode.<br>= X, Number of PCI bus clocks transpired during an ODT session.<br>Note: Effects of PCI Latency Time Out Values can be studied with this counter. |

FIG. 7A(2)

ODT System Control Register (SCR)

| Add | Mode | Bits | 15 | 14 | 13 | 12 | 11 | 10 | 9 | 8 | 7 | 6 | 5 | 4 | 3 | 2 | 1 | 0 |
|-----|------|------|----|----|----|----|----|----|----|----|----|----|----|----|----|----|----|----|
| 63H | W | Field | TEN | TAB | CCI | CE | | | | | | | Reserved | | | | | |

602

702  704  706  708

| Bits | Field | Description |
|------|-------|-------------|
| 15 | T-EN | This "Timer Enable" bit used by ODT to allow one of two timers to set the "Go" bit which initiates a search of the stream request queue. Once enabled, the Timer A or B will generate the Go bit setting at a fixed interval determined by how the Timer is configured.<br>= 0 (Default), Timer selection not enabled.<br>= 1, Timer enabled and when time-out condition occurs ODT's "Go" bit will be set. ODT will clear "Go" bit after one complete pass of the Stream Request Queue. |
| 14 | T-AB | This "Time A or B" selection bit is used to select one of the two CAMIL-L Timers A or B which will set ODT's "Go" bit.<br>= 0 (Default), CAMIL-L's Timer-A Selected.<br>= 1, CAMIL-L's Timer-B Selected. |
| 13 | CCI (PCI Clock Count Interrupt) | When the PCI Clock Counter is done counting bus master clocks due to the end of a bus master access, this bit will cause a maskable ODT DIAGNOSTIC interrupt to both DSP's, and the mask control is done via write to the bit. Interrupt is cleared by a DSP reading this SCR register. Writes<br>= 0 (Default), CCI Interrupt is masked and will not cause an interrupt.<br>= 1, CCI Interrupt is un-masked and will cause an interrupt. |
| 12 | CE (Counter Enable) | Enable bit for ODT's counter that counts total number of PCI bus clocks during an ODT transfer session. This bit includes PCI latency time out or premature termination of PCI bus acquisition.<br>= 0 (Default), ODT counter is inactive and consuming no power.<br>= 1, ODT counter is active. |
| 11-0 | Reserved | Reserved |

ODT TRANSFER STATUS & CONTROL

FIG. 7B(1A)

ODT Transfer Status and Control Register 1 (TSCR1 – Read by Peripheral (e.s. DSP))

| Add | Mode | Bits  | 15 | 14 | 13 | 12 | 11 | 10 | 9 | 8 | 7 | 6 | 5 | 4 | 3 | 2 | 1 | 0 |
|-----|------|-------|----|----|----|----|----|----|----|----|----|----|----|----|----|----|----|----|
| 60H | R    | Field | G  | S  |    |    | ODT STAT |  |  |  |  |  |  |  | STAT-Stream |  |  |  |

| Bits | Field | Description |
|------|-------|-------------|
| 15 | G | "Go" bit used to initiate search by ODT for a valid transfer entry in the stream request queue:<br>= 0 (Default), ODT not active and is at it's power saving state.<br>= 1, ODT is active |
| 14 | S | ODT "Stop" bit used to HALT ODT<br>= 0 (Default), ODT Engine in ready state.<br>= 1, ODT Engine as completed transfer of current active stream and has stopped. |
| 13 | STAT[6]<br>(F bit Cleared) | ODT has completed requested stream block transfer and has cleared stream request queue's request "Flag" bit. After this bit is cleared and appropriate entry in MPRAM'S stream request queue is update, ODT will cause a DSP1 maskable interrupt to occur. Note that if "I" bit is set, then no interrupt will occur even though interrupt is enabled. This feature reduces the number of DSP interrupts by grouping streams and processing them in batches.<br>= 0 (Default), Interrupt not active.<br>= 1, Interrupt is active indicating that ODT has completed transfer requested.<br>Note: This interrupt is cleared by 1st DSP1 read of this TSCR1 register. |
| 12 | STAT[5]<br>(HI not clear) | ODT is at HOST bank boundary and has deleted HOST's Interrupt "HI" bit not cleared by HOST. The HOST ISR is responsible for servicing HOST cyclic buffer memory and clearing "HI" bit, which was previously set by ODT before interrupting HOST. This provides a feedback mechanism for ODT to detect that the next cyclic memory bank was not serviced by HOST and inform DSP via interrupt. This bit will cause a DSP1 maskable interrupt to occur.<br>= 0 (Default), Interrupt not active.<br>= 1, Interrupt is active indicating HOST has not serviced previous bank.<br>Note: This interrupt is cleared by 1st DSP1 read of this TSCR1 register. |

FIG. 7B(1B)

| | | |
|---|---|---|
| 11 | STAT[4] (HOST Stream Interrupt Queue Collision) | ODT has detected a collision with HOST Stream Interrupt Queue. ODT Engine has determined this by first reading current stream interrupt queue entry and sensing that MSB has not been cleared by HOST. If HOST has cleared MSB, then no collision has occurred and no interrupt generated.<br>= 0 (Default), Interrupt not active.<br>= 1, Interrupt is active indicating ODT has caught-up with HOST's Interrupt Queue.<br>Note: This interrupt is cleared by HOST or DSP clearing "R" bit in ODT's HOST Interrupt Queue Pointer Register, which is only set by ODT. |
| 10 | STAT[3] (Emergency STOP by ODT) | ODT has detected a mismatch of the upper 6 MSBits of the current 32Bit HOST transfer pointer and 6 MSBits of the HOST Interrupt Queue Pointer. This condition warrants an emergency stop by ODT, which means that ODT will not complete the current block requested for transfer. ODT will set the Stop Bit, and will wait for the HOST for DSP to write to the HOST Interrupt Queue Register. This register will reset what ODT will use as the upper 6 Bits of each PCI bus master access.<br>= 0 (Default), Interrupt is not active.<br>= 1, Interrupt is active.<br>Note: This interrupt is cleared by HOST or DSP updating HOST Interrupt Queue Register with valid 32Bit HOST pointer. ODT will resume from this emergency stop state after interrupt is cleared. |

FIG. 7B(2)

| | | |
|---|---|---|
| 9 | STAT[2] (PCI Latency) | During requested transfer, ODT was forced to relinquish PCI bus per Latency time-out condition and immediately request the bus again. It is ODT's responsibility to keep track of how many words have been transferred, so that the next consecutive time LuPCI acquires the bus, ODT starts from where it left-off and completes requested transfer. This bit will cause a DSP maskable interrupt to occur.<br>= 0 (Default), Interrupt not active.<br>= 1, Interrupt is active indicating transfer was interrupted by PCI time out condition.<br>Note: This interrupt is cleared by 1st DSP1 read of this TSCR1 register. |
| 8 | STAT[1] (Premature Termination) | LUCENT's PCI Interface logic (LUPCI) has detected a premature termination by HOST PCI system during a transfer request from ODT Engine. This bit will cause a DSP markable interrupt to occur.<br>= 0 (Default), Interrupt not active.<br>= 1, Interrupt is active.<br>Note: This interrupt is cleared by 1st DSP 1 read of this TSCR1 register. |
| 7 | ODT Interrupt Type | This bit defaults to "0". Reserved for future versions of ODT.<br>= 0 (Default), Interrupt due to an ODT stream indicted by bit #6-0.<br>= 1, Reserved. |
| 6-0 | STAT-Stream | Stream number associated with ODT Interrupt indicated by STAT bits. |

FIG. 7B(3A)

ODT Transfer Status and Control Register 1 (TSCR1–Write by Peripheral (e.s. DSP))

| Add | Mode | Bits | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 60H | W | Field | G | S | | | STAT Interrupt MASK | | | | | | | Reserved | | | | |

| Bits | Field | Description |
|---|---|---|
| 15 | G | "Go" bit used by DSP1 to initiate an ODT search for a valid entry in the stream request queue:<br>= 0 (Default), Nothing happens to ODT when Zero is written to this Bit.<br>= 1, Writing a One to this bit by DSP1 is an indication for ODT to wake up and process stream request queue. ODT will set this bit to one when it has awaken by any ODT agent, such as HOST, DSP1, DSP2 or Timer.<br>Note: a) There can be multiple source that can set ODT's "Go" bit. Possible sources are:<br>• DSP1 write to this "Go" bit via TSCR1[15]=1<br>• DSP2 write to it's "Go" bit via TSCR2[15]=1<br>• HOST write to it's "Go" bit via TSCR3[15]=1<br>• CAMIL-L's Timer-A can also set this "Go" bit TSCR1[15]=1 via enable control in ODT's System Control Register bits #15 & #14 (i.e.SCR[15,14]).<br>• CAMIL-L's Timer-B can also set this "Go" bit TSCR1[15]=1 via enable control in ODT's System Control Register bits #15 & #14 (i.e.SCR[15,14]).<br>b) ODT will clear this "Go" bit, only after one complete pass of the entire stream request queue.<br>c) Since this "Go" bit can be set by multiple independent sources, and each "Go" request must be serviced independently, the "Go" bit is latched for each source and Or'ed together. The state of this Or'ed signal is indicated by "Go" Bit. (Refer to ODT system control register for more detailed description of interrupt control bits). |

FIG. 7B(3B)

| | | |
|---|---|---|
| 14 | S | ODT "Stop" bit used to HALT ODT<br>= 0 (Default), No Request To STOP ODT State Machine by DSP1 Pending.<br>= 1, ODT Engine has completed transfer of current active stream and has stopped.<br>Note: Writing a 1 to this bit is only a request, and only ODT will actually set this bit to 1; so that DSP1 can read it, thus knowing ODT is now in a power saving idle mode. |
| 13-8 | STAT Interrupt MASK | These bits are the interrupt mask control bits for the corresponding STAT[6:1] Interrupt Sources:<br>= 0 (Default), Interrupt is disabled (Mask On)<br>= 1, Interrupts are enabled (Mask off) |
| 7-0 | Reserved | Reserved for future use. |

FIG. 7B(4)

ODT Transfer Status and Control Register 3 (TSCR3-Read by HOST) — 604

| Add | Mode | Bits | 15 | 14 | 13 | 12 | 11 | 10 | 9 | 8 | 7 | 6 | 5 | 4 | 3 | 2 | 1 | 0 |
|-----|------|------|----|----|----|----|----|----|----|----|----|----|----|----|----|----|----|----|
| 62H | R    | Field| G  | S  | Reserved | | | | | | | | | | | | | |

712 — G column; 714 — S column

| Bits | Field | Description |
|------|-------|-------------|
| 15 | G | "Go" bit used to initiate a search by ODT for a valid transfer entry in the stream request queue:<br>= 0 (Default), ODT not active and is at it's power saving state.<br>= 1, ODT is active. |
| 14 | S | ODT "Stop" bit used to HALT ODT<br>= 0 (Default), Interrupt not active.<br>= 1, ODT Engine has completed transfer of current active stream and has stopped. |
| 13–0 | Reserved | Reserved |

FIG. 7B(5)

ODT Transfer Status and Control Register 3 (TSCR3-Write by HOST) 604

| Add | Mode | Bits | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 62H | W | Field | G | S | | | | | | | Reserved | | | | | | | |

712  714

| Bits | Field | Description |
|---|---|---|
| 15 | G | "Go" bit used by HOST to initiate an ODT search for a valid entry in the stream request queue.<br>= 0 (Default), Nothing happens to ODT when Zero is written to this Bit.<br>= 1, Writing a One to this bit by HOST is an indication for ODT to wake up and process stream request queue. ODT will set this bit to one when it has awaken by any ODT agent, such as HOST, DSP1, DSP2 or Timer.<br>Note: a) There can be multiple source that can set ODT's "Go" bit Possible sources are:<br>• DSP1 write to it's "Go" bit via TSCR1[15]=1<br>• DSP2 write to it's "Go" bit via TSCR2[15]=1<br>• HOST write to this "Go" bit via TSCR3[15]=1<br>• CAMIL-L's Timer-A can also set this "Go" bit TSCR3[15]=1 via enable control in ODT's System Control Register bits #15 & #14 (i.e.SCR[15,14]).<br>• CAMIL-L's Timer-B can also set this "Go" bit TSCR3[15]=1 via enable control in ODT's System Control Register bits #15 & #14 (i.e.SCR[15,14]).<br>b) ODT will clear this "Go" bit, only after one complete pass of the entire stream request queue.<br>c) Since this "Go" bit can be set by multiple independent sources, and each "Go" request must be serviced independently, the "Go" bit is latched for each source and Or'ed together. The state of this Or'ed signal is indicated by "Go" Bit. (Refer to ODT system control register for more detailed description of interrupt control bits). |
| 14 | S | ODT "Stop" bit used to HALT ODT<br>= 0 (Default), No Request To STOP ODT State Machine by HOST Pending.<br>= 1, ODT Engine has completed transfer of current active system and has stopped.<br>Note: Writing a 1 to this bit is only a request, and only ODT will actually set this bit to 1; so that HOST can read it, thus knowing ODT completed house-keeping and is now in idle mode. |
| 13-0 | Reserved | Reserved |

HOST & DSP QUEUE DEPTH

FIG. 7C(1)

ODT HOST Stream Interrupt Queue & DSP Request Queue Depth  606

| Add | Mode | R/W | Field | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| 64H | | | | | | | INT_Q_End | | | | | | | | Req_Q_End | | | | |

720 — INT_Q_End
722 — Req_Q_End

| Bits | Field | Description |
|---|---|---|
| 15-8 | INT_Q_End | The 8 bit word aligned pointer pointing to the (End Address+1) of HOST Stream Interrupt Queue Entries, assuming that the HSIQ Start address and the End address of the HSIQ are Dword aligned. The pointer is a 32 bit pointer but only the 8 LSB's are used to program the register. Maximum of 254 entries.<br>Example:<br>1) If the Host Stream Interrupt Queue (HSIQ) start at the host address 0300 0000H and the software application requires 128 HSIQ entries (every HSIQ entry is 16-bit or 2 bytes), then the value to be programmed in the INT_Q_End register is (0300 0000H + (80H*2)) = End Address, 0300 0100H) 80H (the bits 8 through 1 of the End address).<br>2) If the Host Stream Interrupt Queue (HSIQ) start at the host address 0300 008CH and the software application requires 128 HSIQ entries (every HSIQ entry is 16-bit or 2 bytes), then the value to be programmed in the INT_Q_End register is (0300 008CH + (80H*2)) = End Address, 0300 018CH) C6H ( the bits 8 through 1 of the End address).<br>=0 (Default), ODT not active and is at it's power saving state. Queue Size is one.<br>=X, number of entries in HOST stream interrupt queue. |
| 7-0 | Req_Q_End | The 8 bit pointer pointing to the End Address of the Stream Request Queue (SRQ). The SRQ pointer is a 16 bit pointer but only the 8 LSB's are used to program the register. Maximum of 256 entries.<br>Example:<br>1) If the SRQ starts at the address 3C00H and the software application requires 128 entries, the value to be programmed into the register is (3C00H + 7FH = 3C7FH) 7FH.<br>2) If the SRQ starts at the address 3D45H and the software application requires 128 entries, the value to be programmed into the register is (3D45H + 7FH = 3DC4H) C4H.<br>= 0 (Default), ODT not active and is at it's power saving state. Quuiumum Size is one.<br>= X, number of entries in Transfer Stream Request queue. |

FIG. 7D

PERIPHERAL STREAM POINTERS

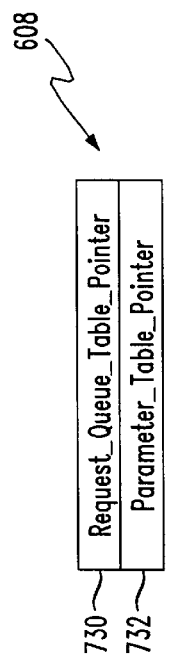

730 — Request_Queue_Table_Pointer
732 — Parameter_Table_Pointer

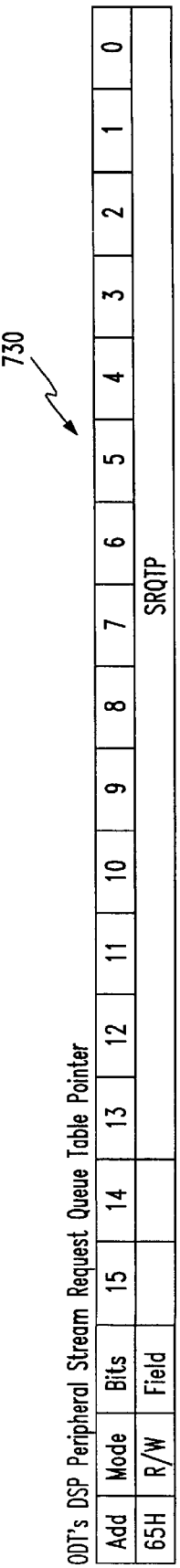

730

ODT's DSP Peripheral Stream Request Queue Table Pointer

| Add | Mode | Bits | 15 | 14 | 13 | 12 | 11 | 10 | 9 | 8 | 7 | 6 | 5 | 4 | 3 | 2 | 1 | 0 |
|-----|------|------|----|----|----|----|----|----|----|----|----|----|----|----|----|----|----|----|
| 65H | R/W  | Field |    |    |    |    |    |    |    |    |    | SRQTP |    |    |    |    |    |    |

| Bits | Field | Description |
|------|-------|-------------|
| 15–0 | SRQTP | This 16 bit address is used by ODT to point to the beginning of the Stream Request Queue. ODT will use Req_Q_End value as the size of the stream request queue.<br>= 0000H (Default), ODT not active and is at it's power saving state. Pointer at highest value.<br>= X, address that ODT will use to point to stream request queue. |

FIG. 7D(2)

ODT's DSP Stream Parameter Table Pointer

| Add | Mode | Bits | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 66H | R/W | Field | | | | | | | | | SPTP | | | | | | | |

732

| Bits | Field | Description |
|---|---|---|
| 15-0 | SPTP | This 16 bit address is used by ODT to point to the beginning of the Stream Parameter Table. ODT will use SPTP Pointer and increment 4 words worth per stream to point to a valid stream parameter table.<br>= 0000H (Default), ODT not active and is at it's power saving state. Pointer at highest value.<br>= X, address that ODT will use to point to stream request queue. |

ODT STREAM PARAMETER TABLE

FIG. 7E(1A)

ODT's Current Stream Request Queue Entry Register

| Add | Mode | Bits | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 67H | R | Field | M | F | D | Block Size | | | | | | | | Stream # | | | | |

| Bits | Field | Description |
|---|---|---|
| 15 | M | HOST Interrupt "Mask" bit. This bit alows ODT to make entries in HOST Steam Interrupt Queue, but does not cause an ODT Interrupt to the HOST.<br>= 0 (Default), HOST will be interrupted after an new entry to Stream Interrupt Queue by ODT.<br>= 1, ODT will not cause an interrupt to HOST due to a new entry in HOST Interrupt Queue.<br>Note: ODT will clear this bit after the block request has been completely transferred. |
| 14 | F | Transfer Request "Flag" bit is used by ODT to accept and acknowledge the request for a steam's block transfer. The acknowledge of a completed transfer occurs via a maskable interrupt based on ODT clearing M and F bits after requested block has been transferred.<br>= 0 (Default), No request pending. ODT will continue with next valid entry.<br>= 1, ODT has been requested to perform a data block transfer.<br>Note: a) ODT will clear this bit after the block request has been completely transferred.<br>b) ODT will also generate a maskable ODT STAT interrupt after "F" Bit is cleared.<br>c) Summary of (M,F) settings:<br> • (1, 1) = ODT access to DSP RAM space (FPRAM, MPRAM or External RAM).<br> • (0, 1) = ODT access to DSP RAM space (FPRAM, MPRAM or External RAM).<br> • (1, 0) = Reserved.<br> • (0, 0) = ODT has completed transfer request or indication that no transfer request by DSPs or HOST is present. |

FIG. 7E(1B)

| | | |
|---|---|---|
| 13 | D | Transfer "Direction" Indicator bit used by ODT to determine direction of requested block transfer.<br>= 0 (Default), RX direction active which is from DSP memory to HOST system memory.<br>= 1, TX direction active which is from HOST memory to DSP memory. |
| 12-7 | Block Size | Number of words in a block which is requested for transfer. Maximum of 64 words in a block.<br>= 0 (Default), Block size is one word deep.<br>= X, number of words in a block. |
| 6-0 | Stream# | This stream number is used by ODT to calculate correct location in Stream Parameter Table and during an ODT STAT interrupt session. ODT will also use this stream number to inform HOST via Steam Interrupt Queue entries which HOST cyclic buffer needs servicing.<br>= 0 (Default), ODT not active and is at it's power saving state. Pointer to first stream.<br>= X, desired stream to be transferred.<br>Note: A maximum of 128 streams are possible. |

FIG. 7E(2A)

ODT's Current Stream Parameter Table Register 1

| Add | Mode | Bits | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 68H | R | Field | HI | C | T | E | Rsvd | I | | | | HOST_ADD_HIGH | | | | | | |

| Bits | Field | Description |
|---|---|---|
| 15 | HI | This HOST Interrupt (HI) bit is set by ODT when ODT is at the end of a HOST bank transfer. The Host ISR will clear this "HI" bit by accessing stream parameter table in shared DSP's MPRAM for specified stream via RMP port access. If HOST ISR does not clear this bit, then ODT will read this "HI" bit during the next consecutive transfer and generate an "HOST Interrupt Not Serviced" (HINS) interrupt to DSP1 or DSP2 via TSCR Register STAT[5] bit #12.<br>= 0 (Default), HI Interrupt is not active.<br>= 1, ODT has made an entry to the HOST stream interrupt queue, set HI bit, and may have caused an interrupt to the HOST depending if "M" bit was set.<br>Note: "HI" bit must be cleared only by HOST via RMP access to stream parameter table. |
| 14 | C | This Continue "C" Flag bit is used by ODT to indicate that ODT is to store the incremented DSP address back into the stream parameter table in the shared DSP RAM. This bit will allow efficient DSP code due to lower overhead for the DSP to manage DSP addresses after each block transfer. This bit provides a good method of transferring large blocks of data without the DSP involved.<br>= 0 (Default), ODT will not modify DSP address in the stream parameter table in shared RAM.<br>= 1, ODT will modify DSP address in the stream parameter table to point to next DSP address that will be used by ODT for the next block transfer. |
| 13 | T | This Transparent ODT Transfer mode bit is used by ODT to not cause any entries to the HOST Interrupt Queue. This mode is intended to be used when a stream's cyclic buffer in HOST system memory is managed only by DSP. An example of this case would be moving bulk delay from DSP RAM to the HOST, requires NO interaction from the HOST CPU.<br>= 0 (Default), Transparent Mode not enabled.<br>= 1, Transparent mode enabled. |

FIG. 7E(2B)

| | | |
|---|---|---|
| 12 | E | This External DSP Address Indicator bit is used by ODT to interpret the DSP address in the "Current Stream Parameter Table Register#3" as an external memory adress.<br>= 0 (Default), DSP Address field is pointing to Internal DSP RAM memory space.<br>= 1, DSP Address field is pointing to External DSP RAM memory space. |
| 11 | Reserved | Reserved for future use. Should be set to "00". |
| 10 | I | This DSP "F" bit cleared Interrupt disable bit is used by ODT to prevent an interrupt to either DSP pointed to by "Y" bit due to ODT completing a block transfer, which is indicated by clearing stream's "F" bit. This "I" bit allows DSP programmers the ability of independently masking transfer completed interrupts for each stream.<br>= 0 (Default), ODT will generate an interrupt to the corresponding DSP that generated the request, after tansfer is completed, which is indicated ODT clearing "F" bit.<br>= 1, ODT will not cause an interrupt to the corresponding DSP that generated the request, after transfer is completed, which is indicated by ODT clearing "F" bit. |
| 9-0 | HOST_ADD_<br>HIGH | ODT will use these bits (CSPTRI[9-0]) to comprise the upper 10 bits of the HOST PCI address AB[25:16] use during stream block transfer between HOST PCI and DSPRAM Y-Space. ODT will use the upper 6 Bits of the HOST Interrupt Queue Pointer as the upper 6bits of the PCI address AB[31:26]. |

FIG. 7E(3)

ODT's Current Stream Parameter Table Register 2

| Add | Mode | Bits | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 69H | R | Field | HOST_ADD_LOW | | | | | | | | | | | | | | | B |

| Bits | Field | Description |
|---|---|---|
| 15-1 | HOST_ADD_LOW | These bits comprise of the lower 15 bits of the HOST PCI address AB[15:1] that ODT will use during the streams block transfer. ODT will assume that AB[0] is always zero due to block transfers are modulo a word boundary and the PCI address points to double word boundaries. |
| 0 | B | This Bank "B" bit is updated by ODT to point to the current Bank that ODT is currently transferring blocks of data.<br>= 0 (Default) ODT is operating in Bank A, which is the 1st half of the HOST cyclic buffer.<br>= 1. ODT is operating in BANK B, which is the 2nd half of the HOST cyclic buffer. |

FIG. 7E(4)

ODT's Current Stream Parameter Table Register 3

| Add | Mode | Bits | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 6AH | R | Field | Y | | | | | | | | DSP_ADDRESS | | | | | | | |

752  746

| Bits | Field | Description |
|---|---|---|
| 15 | Y | This DSP "Y" space indicator bit is used by ODT to determine which DSP is the DSP address field in the "Current Stream Parameter Table Register 3" intended to be used. This bit provides a mechanism to identify which DSP is using the current stream.<br>= 0 (Default), DSP address is based on DSP1's memory space.<br>= 1, DSP address is based on DSP2's memory space.<br>Note: This bit will also be used to distinguish which DSP will be interrupted via TSCR1 or TSCR2. The direction "D" bit will also be used to screen ODT TX & RX interrupts.<br>TSCR2. The direction "D" bit will also be used to screen ODT TX & RX interrupts. |
| 14–0 | DSP_ADDRESS | These bits are used to point to the DSP "Y" memory space AB[14:0]. The MSB (AB[15]) is determined by both "Y" and "E" bits in the "Current Stream Parameter Table Reg 2 & 3". |

FIG. 7E(5)

ODT's Current Stream Parameter Table Register 4

| Add | Mode | Bits | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 6BH | R | Field | Current_Count | | | | | | | | Block_Count | | | | | | | |

↖750  ↖748

| Bits | Field | Description |
|---|---|---|
| 15-8 | Current_Count | These bits are updated by ODT to keep track of how many blocks have been transferred. When this count is decremented to zero by ODT, ODT will know that this is the last block to be transferred. A maximum of 256 blocks can be transferred per Bank which is half a cyclic buffer. |
| 7-0 | Block_Count | These bits are used by ODT to reset the "Current Count" bits after the last block has been transferred for a given Bank.<br>Special Note:<br>If (Block_Count = 0), then the value of "Current Count" is used by ODT to Count the number of times a block is transferred, thus providing a mechanism to transfer very large block of upto 16K words (64 word x 256) per Stream Request Queue Entry. This mode is called "Dump Transfer Mode".<br><br>"Dump Transfer Mode" assumes that block transfers and HOST cyclic buffer management is occuring in both DSP and HOST software. ODT will cause entries in the HOST stream interrupt queue only when Interrupt Mask bit "M" of the SRQ is '0' and the Transparent mode bit "T" is '0'. ODT will cause only one entry in the HOST stream interrupt queue at the end of the Dump Transfer i.e, when Current_count reaches zero. ODT will update HOST PCI address field in the DSP's stream parameter table only once at the end of the Dump Transfer. In other words ODT will not write back any HOST PCI address fields, because ODT assumes that software is initializing HOST PCI address per block transferred. ODT will write back last DSP address if "C" bit is set, otherwise no updates (i.e., write backs) to the stream parameter table occurs. |

FIG. 7F
ODT'S HOST INTERRUPT POINTER

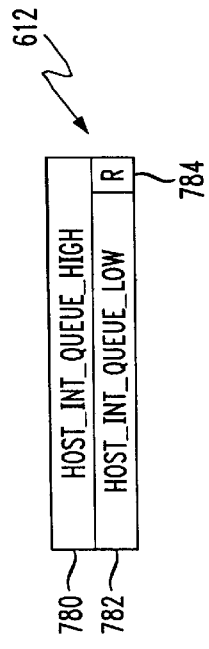

FIG. 7F(1)

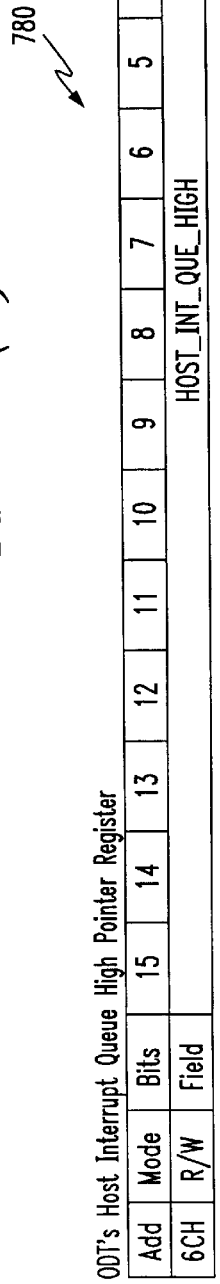

ODT's Host Interrupt Queue High Pointer Register

| Add | Mode | Bits | Field |
|---|---|---|---|
| 6CH | R/W | 15 14 13 12 11 10 9 8 7 6 5 4 3 2 1 0 | HOST_INT_QUE_HIGH |

| Bits | Field | Description |
|---|---|---|
| 15-0 | HOST_INT_QUE_HIGH | HOST Steam Interrupt Queue Address bits 31 TO 16. ODT Engine will use these bits to form the address of the HOST PCI 32bits pointer to the top of the HOST Stream Interrupt Queue. ODT will create a cyclic Interrupt Request Queue with a depth determined by "INT_Q_DEPTH" field in the HOST & DSP Queue Depth Register.<br>Note: This register defaults to all zero, and must be initialized correctly before ODT can initiate data transfers. |

FIG. 7F(2)

ODT's HOST Interrupt Queue LOW Pointer Register

| Add | Mode | Bits | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 6DH | R/W | Field | HOST_INT_QUE_LOW | | | | | | | | | | | | | | | R |

↖784
↖782

| Bits | Field | Description |
|---|---|---|
| 15-1 | HOST_INT_QUE_LOW | HOST Steam Interrupt Queue Address bits 15 to 1. ODT will assume that Bit 0 is set to zero, and will use these bits to form the address of the HOST PCI 32bits pointer to the top of the HOST Stream Interrupt Queue. ODT will create a cyclic Interrupt Request Queue with a depth determined by "INT_Q_DEPTH" field in the HOST & DSP Queue Depth Register.<br>Note: This register defaults to all zero, and must be initialized correctly before ODT can initiate data transfers. |
| 0 | R | An ODT Emergency Error event occurred. This event only happens when the ODTs Current HSIQ pointer matches the Current Host HSIQ Pointer (CHHP) register (Table 4.20). This means that HOST was lagging behind in servicing the interrupts and ODT has caused entries into the HSIQ such that the HSIQ is completely full. The event is conveyed to the HOST through the ODT Emergency Stop Interrupt. When this event happens the ODT will not transfer any data until the interrupts are serviced and the "R" bit is cleared. This "R" bit must be cleared by HOST or DSP by writing "0" to this bit location. It is the responsibility of the HOST software to service the interrupts in the HSIQ, update the CHHP register and then clear the "R" bit to restart the ODT. ODT will start the transfers where it left off.<br>Read<br>= 0 (Default), No Emergency Error Event has occurred.<br>= 1, An Emergency Error Event has occurred and must be cleared by HOST or DSP software.<br>Write<br>= 0, The "R" bit will be cleared.<br>= 1, No effect. |

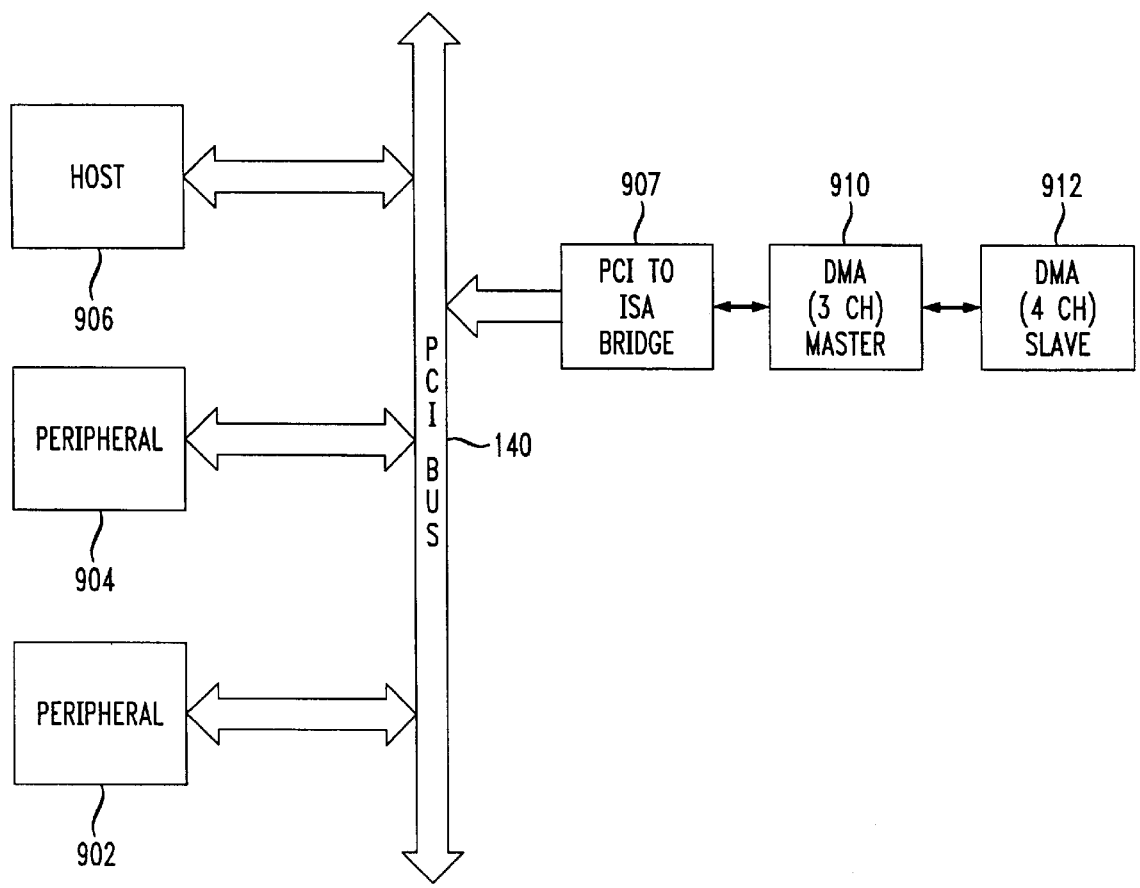

ON-DEMAND TRANSFER ENGINE

This application claims priority from U.S. Provisional Application Ser. No. 60/065,855 entitled "Multipurpose Digital Signal Processing System" filed on Nov. 14, 1997, the specification of which is hereby expressly incorporated herein by reference.

BACKGROUND OF THE INVENTION

1. Field of the Invention

This invention relates generally to a memory transfer device. More particularly, it relates to a memory transfer device allowing a large number of transfer blocks to be passed over a Peripheral Component Interconnect (PCI) bus in a personal computer.

2. Background of Related Art

In traditional Industry Standard Architecture (ISA) based personal computing systems, a Direct memory Access (DMA) controller is responsible for transferring data between host system memory and peripheral input/output (I/O) devices, e.g., a floppy disk, a hard drive, an audio device, etc.

FIG. 9 shows a conventional personal computer (PC) based system including a host processor 906, and a plurality of peripheral devices 902–904. A DMA controller 910 in communication with a PCI bus 140 through the PCI to ISA bridge 907 facilitates the transfer of blocks of data to and from peripheral to peripheral or host to peripheral.

A conventional DMA controller is typically capable of handling a maximum of only four block transfer channels in a single DMA controller mode. One such conventional DMA controller is a Model 8237 available from Intel and found in many personal computers. In enlarged systems, a secondary DMA controller 912 may be included in a master-slave configuration to the master DMA controller 910 to provide a total of up to 7 data stream transfer channels.

FIG. 10 shows the centrally located input/output (I/O) mapped registers defined for each channel in a DMA controller 910, 912. These registers are typically programmed only by the host 906.

Typical registers in a DMA controller 910, 912 are a 16-bit host buffer address (e.g., source start address) register 940, a destination start address register 942, a 16-bit transfer count (e.g., byte count) register 944, and perhaps even an 8-page buffer (not shown). The conventional DMA controller 910, 912 is programmed with a value of the source start address 940, the destination start address 942, and the length of the data block to be transferred (byte count) 944 for each of the 7 data transfer channels.

To initiate a data transfer, a host device must program each of the source start address 940, the destination start address 942, and the byte count 944, and, whenever the peripheral desires to transfer data, send a request to the DMA controller 910, 912 to initiate the data transfer. To transfer buffered blocks of data relating to a continual data stream, particularly buffered blocks of data having a variable length, the byte count register 944 relating to the appropriate DMA channel must be programmed before the transfer of each block of data. Unfortunately, the time required for communication over the PCI bus 140 to affect the appropriate change in the length of the data block (i.e., to update the byte count register 944) limits the total amount of data which may be transferred in any given amount of time.

Although the centralized concept of a DMA controller provides the ability to transfer as many as 7 data blocks, the transfer requires communication with the centrally located DMA controller 910, 912. Because the conventional DMA controller is centrally located, access may be limiting to certain applications transferring large amounts of data. Moreover, as discussed, applications transferring blocks of data which have a variable length (e.g., some audio applications) require arbitration for the PCI bus 140 and communication with the DMA controller by the requesting device to reset the block length before each data transfer, potentially wasting time, increasing traffic on the PCI bus 140, decreasing efficiency in the data transfer, and expending valuable MIP (million instruction per second) capacity in the requesting device. Thus, management of the data buffer to be transferred is quite limited and does not offer much flexibility to the user in a DMA controller-based system.

Many conventional agents such as an IDE hard disk controller or a SCSI controller have been implemented to use one or two channels of a DMA controller. However, today's computing advances are becoming limited by the relatively small number of block transfer channels made available by conventional DMA controllers. For instance, hardware accelerated multimedia applications would benefit greatly from the ability to transfer more than 7 channels (i.e., data streams) between host memory and peripherals available using today's technology.

There is thus a need for a more versatile and distributed apparatus and method for allowing the transfer of more than 7 data streams in a personal computer (PC) related application.

SUMMARY OF THE INVENTION

In accordance with the principles of the present invention, a block memory transfer module comprises a start address for a block of memory to be transferred. The start address is maintained in memory of a first device, while a length of the block of memory to be transferred is maintained in memory of a second device separate from the first device.

A method of transferring a large plurality of blocks of data over separate data transfer channels in accordance with another aspect of the present invention comprises distributing a plurality of data transfer engines among a respective plurality of devices connected to a data bus, each data transfer engine including a length of a respective at least one of the plurality of blocks of data. A centralized data buffer is maintained relating to one of a source and destination of each of the plurality of blocks of data to be transferred. Each of the plurality of blocks of data is transferred over a separate one of the plurality of data transfer channels based on the length of the plurality of blocks of data established by each of the distributed plurality of data transfer engines.

BRIEF DESCRIPTION OF THE DRAWINGS

Features and advantages of the present invention will become apparent to those skilled in the art from the following description with reference to the drawings, in which:

FIGS. 7D, 7D(1) and 7D(2) show the peripheral stream pointers register of FIG. 6 in more detail.

FIGS. 7F, 7F(1) and 7F(2) show the ODT's host interrupt pointer registers of FIG. 6 in more detail.

FIG. 9 shows a conventional personal computer (PC) based system including a host processor and a plurality of peripheral devices.

FIG. 10 shows the basic registers in a DMA controller relating to each data transfer channel.

DETAILED DESCRIPTION OF ILLUSTRATIVE EMBODIMENTS

Figure 1:
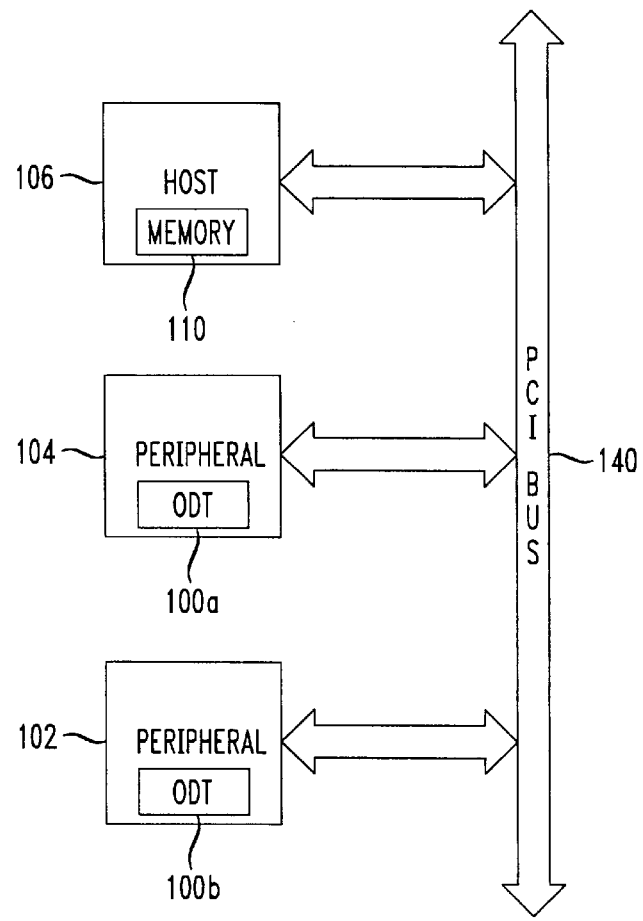
FIG. 1 shows a computer system including one or more peripherals having an on-demand transfer (ODT) engine in accordance with the principles of the present invention.

A motivation for development of the ODT engine as disclosed herein is the proliferation of new modem and multimedia applications surrounding "Direct-X" function calls in Microsoft Windows™ operating system. The ODT engine provides a maximum amount of flexibility for a host and any agent to manage transfers across the PCI bus with the smallest impact to processing "million instructions per second" (MIPS) as well as memory relating to both the host and the agents.

Most personal computers (PCs) are conventionally equipped with a Peripheral Component Interconnect (PCI) bus. The PCI bus is a versatile bus over which any agent connected to the PCI bus can acquire ownership of the bus.

The PCI bus is currently a best candidate bus to provide access to system resources in a burst mode with low processor overhead. The PCI bus standard was developed in response to a marketplace which was becoming crowded with various permutations of local bus architectures implemented in short-sighted fashions.

The first release of the PCI bus specification, version 1.0, became available on Jun. 22, 1992; Revision 2.0 became available in April of 1993, and Revision 2.1 of the specification became available in the first quarter of 1995. All three of these revisions are specifically and explicitly incorporated herein by reference.

The PCI bus can be populated with adapters requiring fast access to each other and/or system memory, and that can be accessed by a host processor at speeds approaching that of the processor's full native bus speed. It is important to note that all read and write transfers over the PCI bus are burst transfers.

The length of the burst is negotiated between the initiator and target devices and may be of any length.

In the disclosed embodiment, the ODT engine is situated between PCI Bus Interface Logic and multi-ported random access memory (RAM) shared by two DSPs.

The PCI bus, unlike the conventional ISA bus, has the capability for peer-to-peer transfers. In a peer-to-peer transfer, any agent on the bus can transfer data directly to another agent on the bus. The capabilities of PCI bus has enabled the development of a distributed data transfer architecture including what is referred to herein as an on-demand transfer engine in each relevant peripheral which will transfer blocks of data.

In this distributed architecture, any agent that requires transfer of data to or from the host memory or to or from a peer agent preferably defines required block data capabilities consistent with the needs of the agent. For example: a hard disk controller may require only one or two block transfer channels for data transfer, whereas an audio accelerator for multimedia applications may require as many as 8 or many more block transfer channels. Other multimedia applications which can benefit from a high bandwidth data transfer capability include MPEG decoders and video accelerators. Conventional DMA architecture is not only limited as to the number of available data transfer channels, but also becomes quite cumbersome as a centrally located device as the number of data transfer channels increases, e.g., up to 128 as are provided by the disclosed embodiment.

The present invention defines a scaleable architecture, i.e., an ODT engine which is targeted for use in any data transfer application. An ODT engine in accordance with the principles of the present invention provides many features that are not available using conventional DMA controllers, including the ability to support large numbers of block transfer channels.

The disclosed embodiment of an ODT engine is a scaleable data transfer module that can support the transfer across a PCI bus of anywhere from 1 to 128 (or more) independent data streams or block data transfer channels for high bandwidth applications. The data can be transferred from host to agent or agent to agent. Each of these 128 streams of data can be of any arbitrary data type, e.g., stereo audio samples, voice samples, modem data, modem bulk delay data, filter coefficients, command control data, and/or DSP program code.

The disclosed ODT engine includes a set of registers that are preferably located in a shared memory location which is accessible by the host and/or any relevant peripheral agent (e.g., a Digital Signal Processor (DSP)). Preferably, as in the disclosed embodiment, the shared memory location is I/O mapped into host I/O memory space.

All pertinent channel information, i.e., start address, word count, and block count for each channel, is programmable. However, as will be described in more detail, the block count for each data transfer block is maintained in a separate memory location, e.g., in the ODT of the relevant peripheral to enable the peripheral to change the length of the data block "on-the-fly". This greatly reduces MIP overhead, particularly with respect to ongoing data streams having variable block sizes as are present in audio applications.

The disclosed ODT engine also includes a flexible interrupting scheme to both the host and to the relevant peripheral agent. Moreover, a plurality of transfer modes are available, e.g., for transfer of data or code overlays.

FIG. 1 shows a computer system including one or more peripherals having an on-demand transfer (ODT) engine in accordance with the principles of the present invention.

In particular, a typical computer system will include a host processor 106 and one or more peripheral devices 102–104. In accordance with the disclosed embodiment, each peripheral device 102–104 which will request the transfer of data will include an ODT engine 100, e.g., ODTs 100a and 100b in the peripheral devices 104 and 102, respectively.

The host 106 and the peripheral devices 102, 104 communicate with one another over an industry standard PCI bus 140. Although the present invention has been described with respect to an embodiment utilizing the PCI standard bus, the principles of the present invention are equally applicable to other bus standards, but particularly to a bus standard implementing burst communications.

A memory block 110 is located somewhere in the PC system, e.g., in the host 106. However, in accordance with the principles of the present invention, the memory block 110 may be located anywhere accessible by the PCI bus 140, including in either of the peripheral devices 102, 104.

Figure 2:
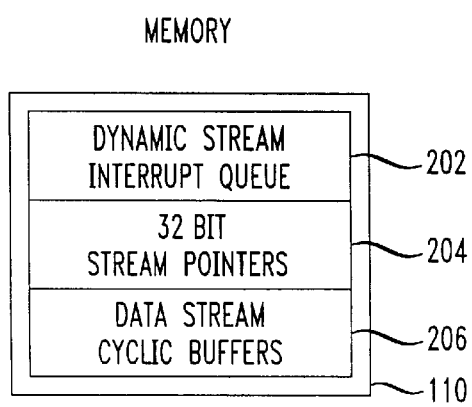
FIG. 2 shows the contents of a memory block within the PC system, e.g., in or relating to the host processor, in accordance with the principles of the present invention.

FIG. 2 shows the contents of an exemplary memory block 110 within the PC system, e.g., in the host 106, in accordance with the principles of the present invention.

The memory block includes a dynamic stream interrupt queue 202, a buffer of from 1 to 128 stream pointers 204, and from 1 to 128 data stream cyclic buffers 206.

Figure 3A:
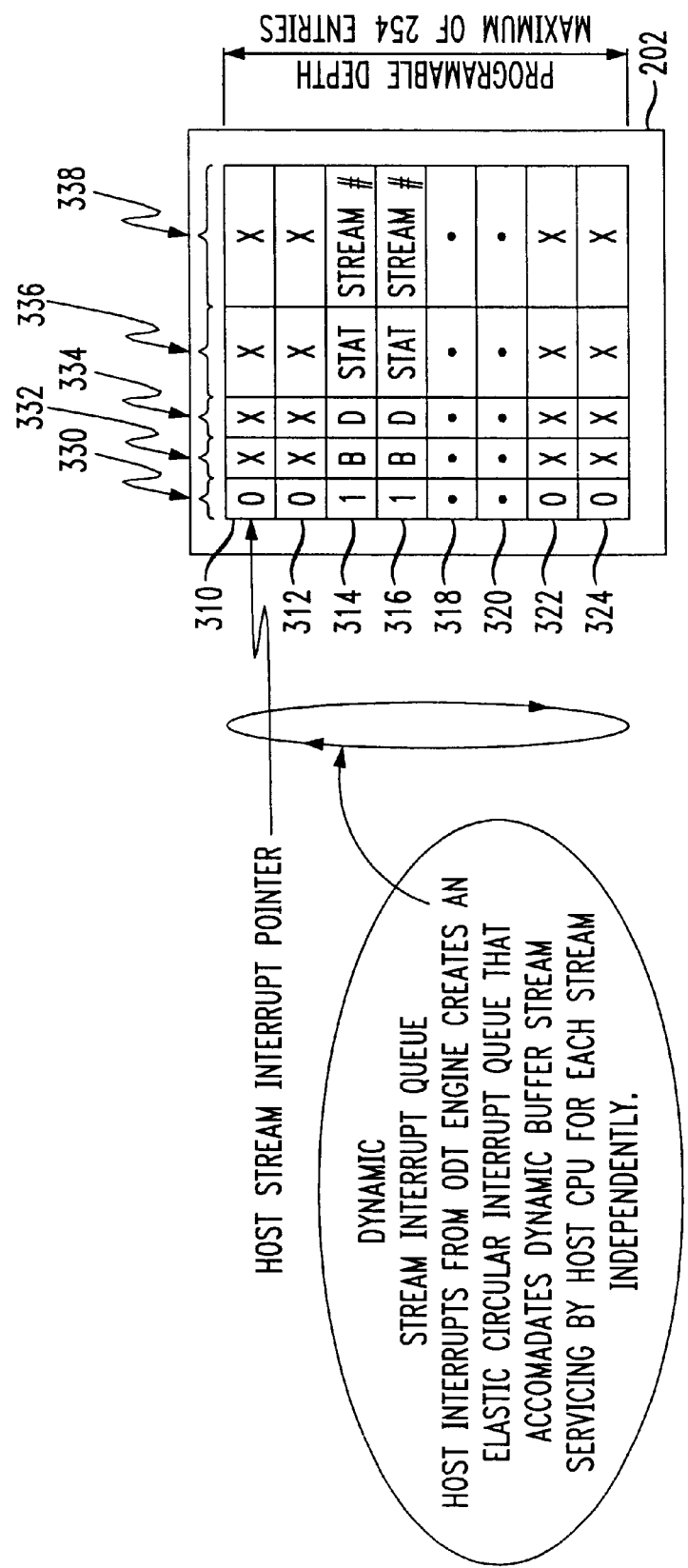
FIGS. 3A and 3A(1) show a circular, dynamic stream interrupt queue in the memory block shown in FIG. 2.

FIGS. 3A and 3A(1) show an exemplary circular, dynamic stream interrupt queue in the memory block shown in FIG. 2.

Figure 7A:
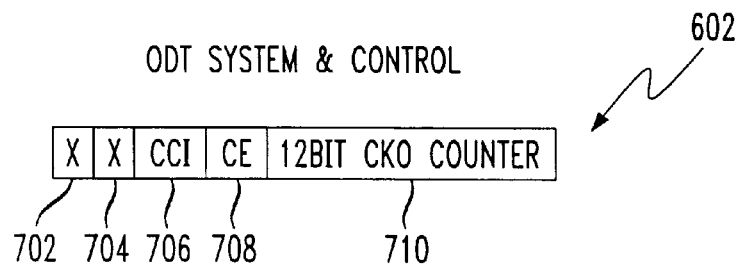
FIGS. 7A, 7A(1A) and 7A(1B) show the ODT system and control register of FIG. 6 in more detail.
Figure 7B:
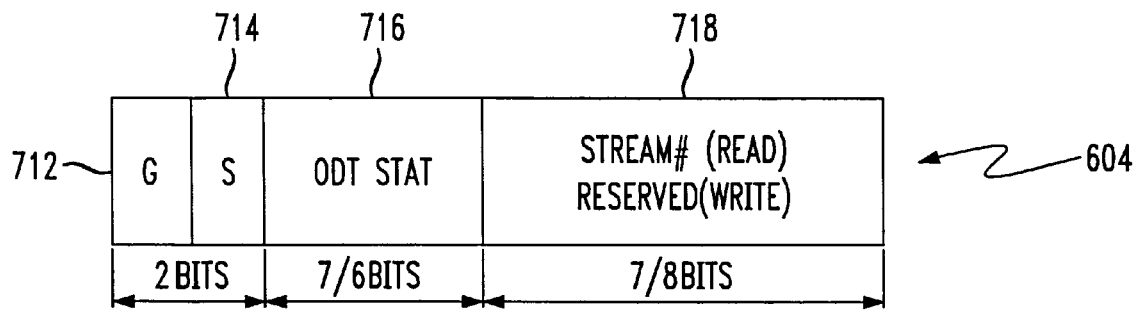
FIGS. 7B and 7B(1A), 7B(1B), 7B(2), 7B(3A), 7B(3B) to 7B(5) show the ODT transfer status and control register of FIG. 6 in more detail.

In particular, column 330 in FIG. 3A indicates whether or not the entry in the dynamic stream interrupt queue 202 is a valid entry ('1') or an invalid entry ('0'). Column 332 indicates the bank number which is to be transferred, e.g., see FIG. 3C. Column 334 indicates a direction of the data transfer, e.g., a '0' indicates a transfer from a peripheral to the host, and a '1' indicates a transfer from host to the peripheral. Column 336 includes the status bits indicating the type of interrupt which is being activated. These bits relate to the host's perspective, and are preferably the same as the six bits from the peripheral's perspective shown in the ODT Stat register 716 of FIG. 7B. Column 338 represents the stream number, i.e., channel number.

FIG. 3A(1) is a table showing one exemplary implementation of a host stream interrupt queue pointer register.

Figure 3B:
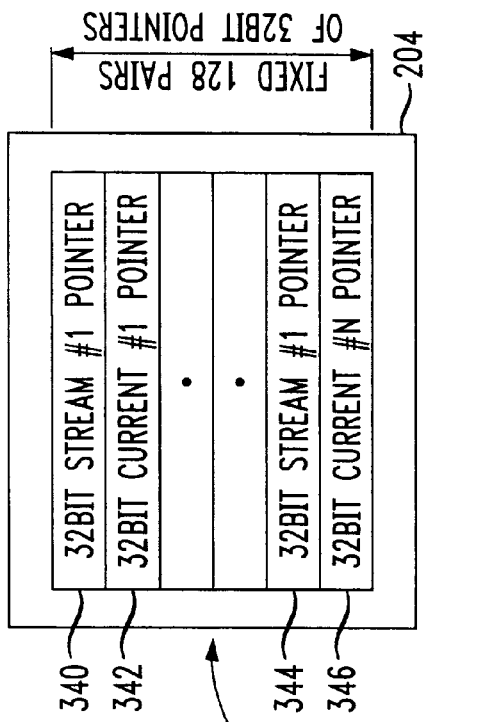
FIG. 3B shows a stream pointer buffer in the memory block shown in FIG. 2.

FIG. 3B shows an exemplary stream pointer buffer in the memory block shown in FIG. 2. Each entry 340–346 is a 32 bit stream pointer indicating the current address of the ODT engine. Two 32-bit stream pointers 340, 342 or 344, 346 correspond to each data stream. Each 32-bit stream pointer indicates the starting address in the host cyclic buffer 206, e.g., as shown in FIG. 3C.

Figure 3C:
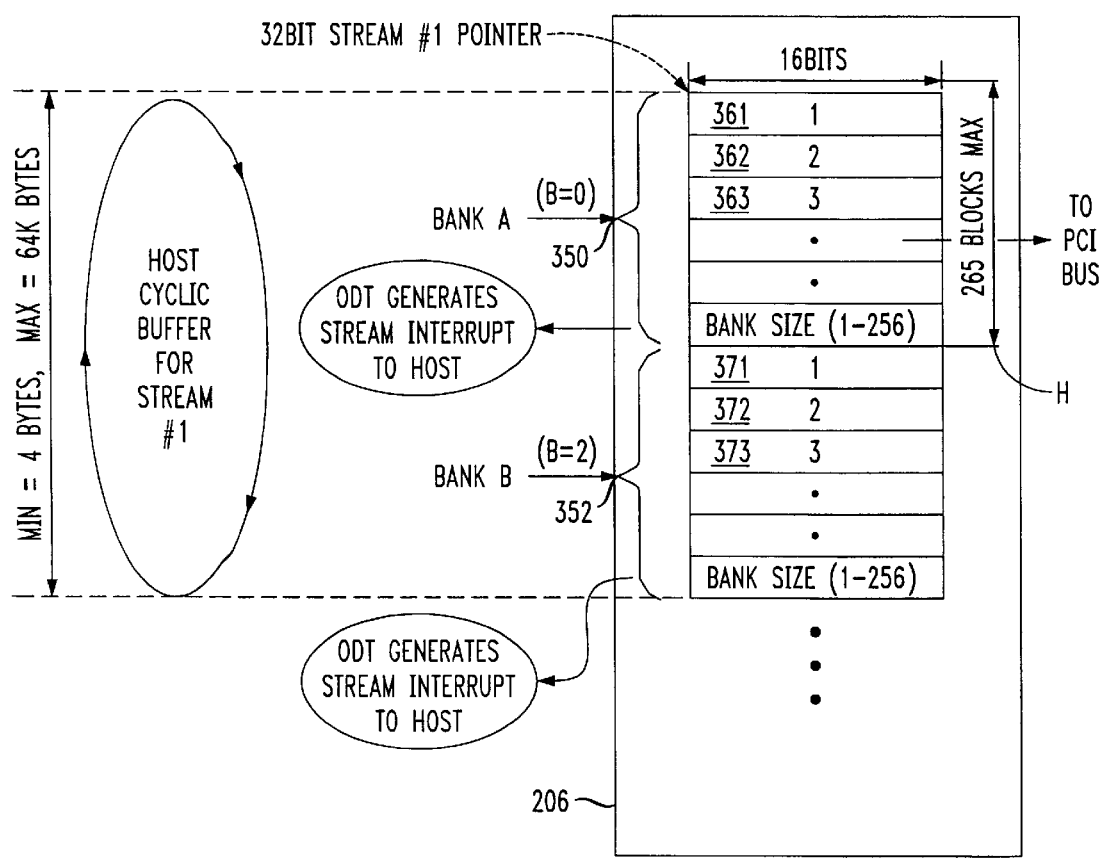
FIG. 3C shows one of up to 128 data stream cyclic buffers in the memory block shown in FIG. 2.

FIG. 3C shows one of up to 128 data stream cyclic buffers in the memory block shown in FIG. 2, and is otherwise known as a host cyclic buffer. Note, for instance, that the 32-bit stream pointer 340 in the example of FIG. 3B indicates the address of the top of bank 350 shown in FIG. 3C.

The entries 361–363 shown in FIG. 3C represent the blocks of data being transferred. In operation, after, for example, data block 361 is transferred, the memory address of the starting address of the data block 362 is input into the 32-bit stream pointer 342 (FIG. 3B).

Data blocks 371–373 are similar blocks of data to be transferred, but from/to the alternate bank 352. The use of two banks 350, 352 allow operation in a ping-pong fashion. Preferably, to avoid conflicts, host and peripherals do not operate on both banks 350, 352 simultaneously.

In operation, the ODT engine generates a stream interrupt to the host whenever the ODT engine reaches the end of a bank 350, 352. At substantially the same time, an entry is written into the host stream interrupt queue 202 to initiate a service interrupt.

Figure 4:
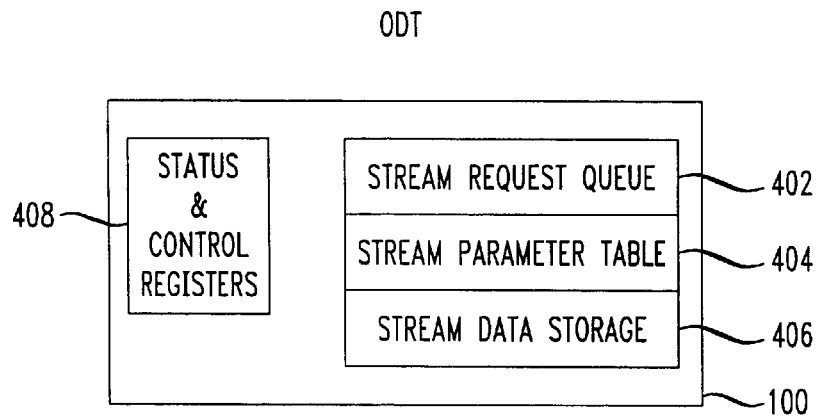
FIG. 4 shows in more detail an on-demand transfer (ODT) engine shown in FIG. 1.

FIG. 4 shows in more detail an on-demand transfer (ODT) engine shown in FIG. 1.

In particular, as shown in FIG. 4, the disclosed embodiment of an ODT engine 100 includes various status and control registers 408, a stream request queue 402, a stream parameter table 404, and stream data storage 406.

Figure 5A:
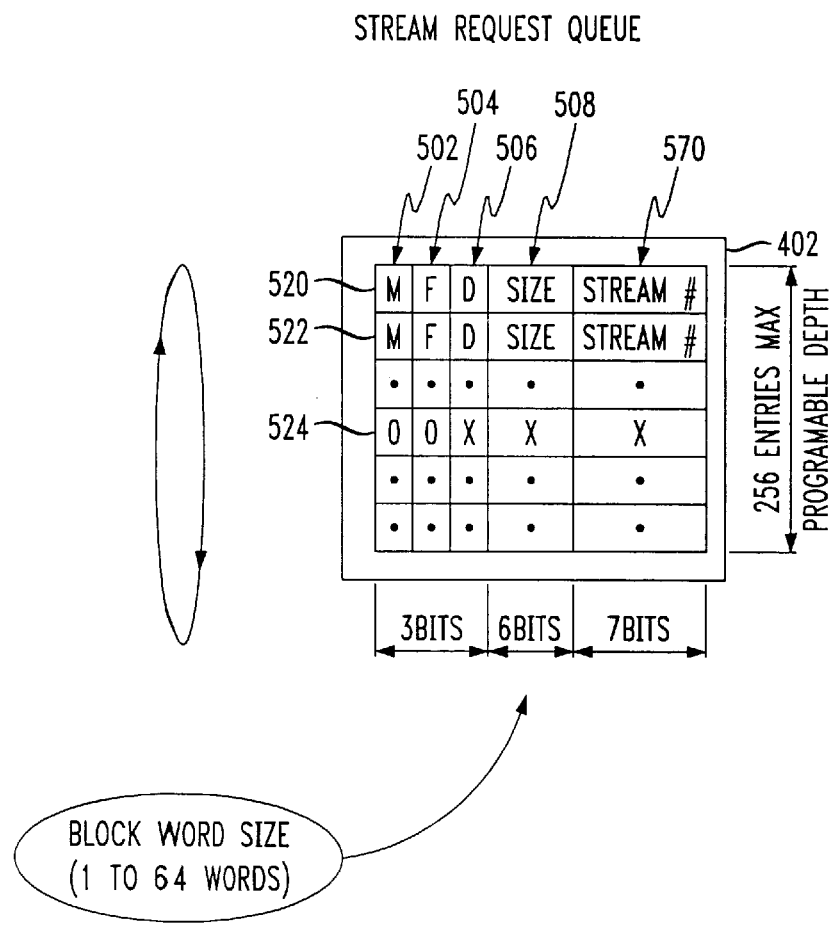
FIG. 5A shows a stream request queue in the ODT engine shown in FIG. 4.

FIG. 5A shows a stream request queue 402 in the ODT engine shown in FIG. 4.

Each row in FIG. 5A represents individual entries 520–522, and the columns 502–510 represent the contents of each entry 520–522. For instance, column 502 is a mask bit to allow masking of the relevant interrupts. Column 504 is a flag indicating whether or not the stream request is active ('1') or inactive ('0'). Column 506 indicates the direction of the data transfer being requested. Column 508 indicates the size of the block of data being transferred, e.g., the number of words to be transferred. For instance, in the disclosed embodiment, the actual number of words transferred is one more than that indicated in the size column 508. Column 510 is the stream number.

The entry 504 is a flag bit in the stream request queue 402 which represents the validity of an entry. For instance, a flag bit 504 of '1' indicates a valid interrupt request, whereas a flag bit 504 of '0' is generated after the peripheral has serviced the relevant interrupt and clears the flag bit 504.

Figure 5B:
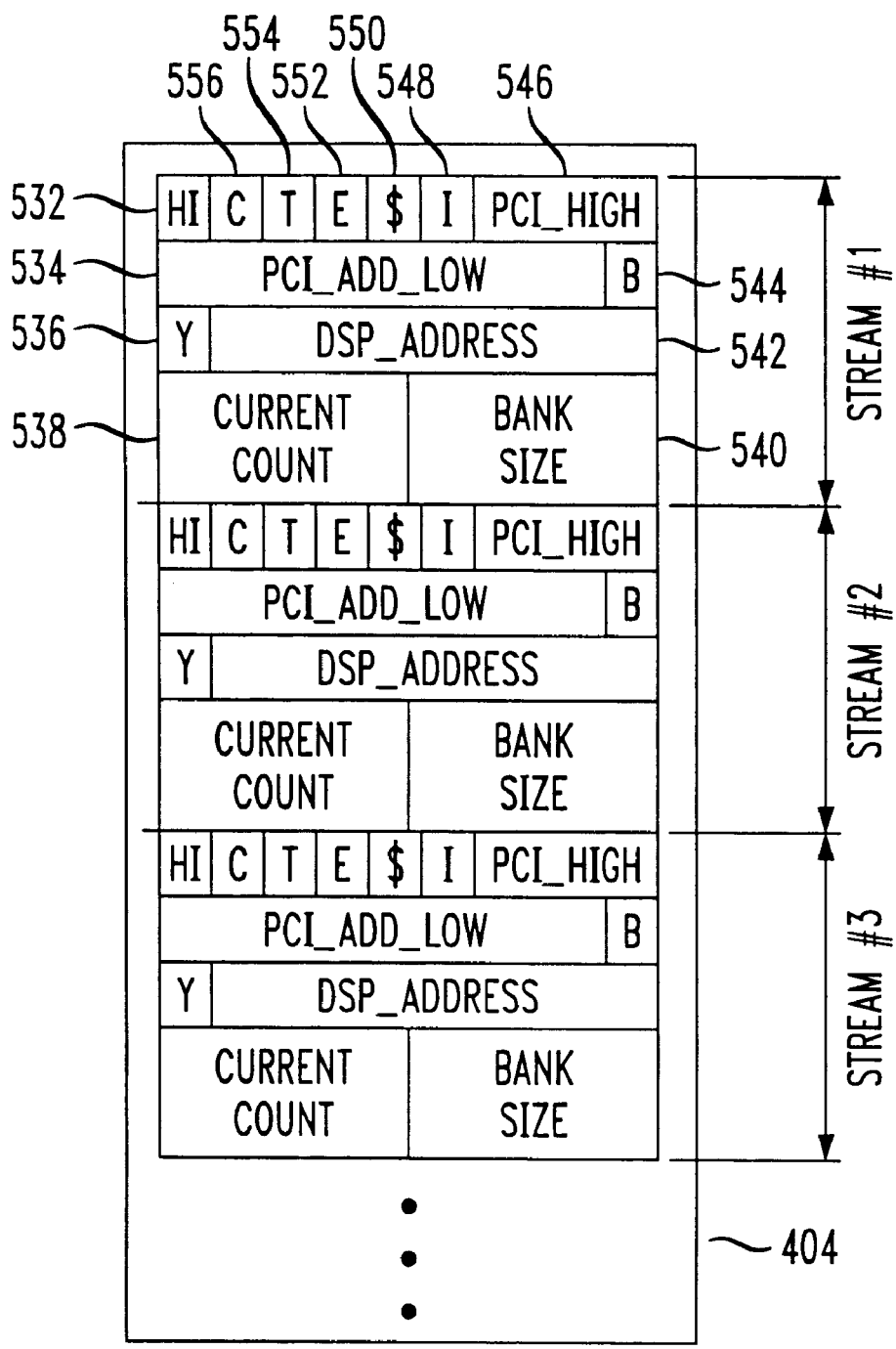
FIG. 5B shows a stream parameter table in the ODT engine shown in FIG. 4.

FIG. 5B shows a stream parameter table in the ODT engine 100 shown in FIG. 4. The stream parameter table 404 shown in FIG. 5B shows three separate entries relating to three respective data streams. Each entry includes a set of information relevant to where the data is located both on the peripheral side and the host side.

Figure 5C:
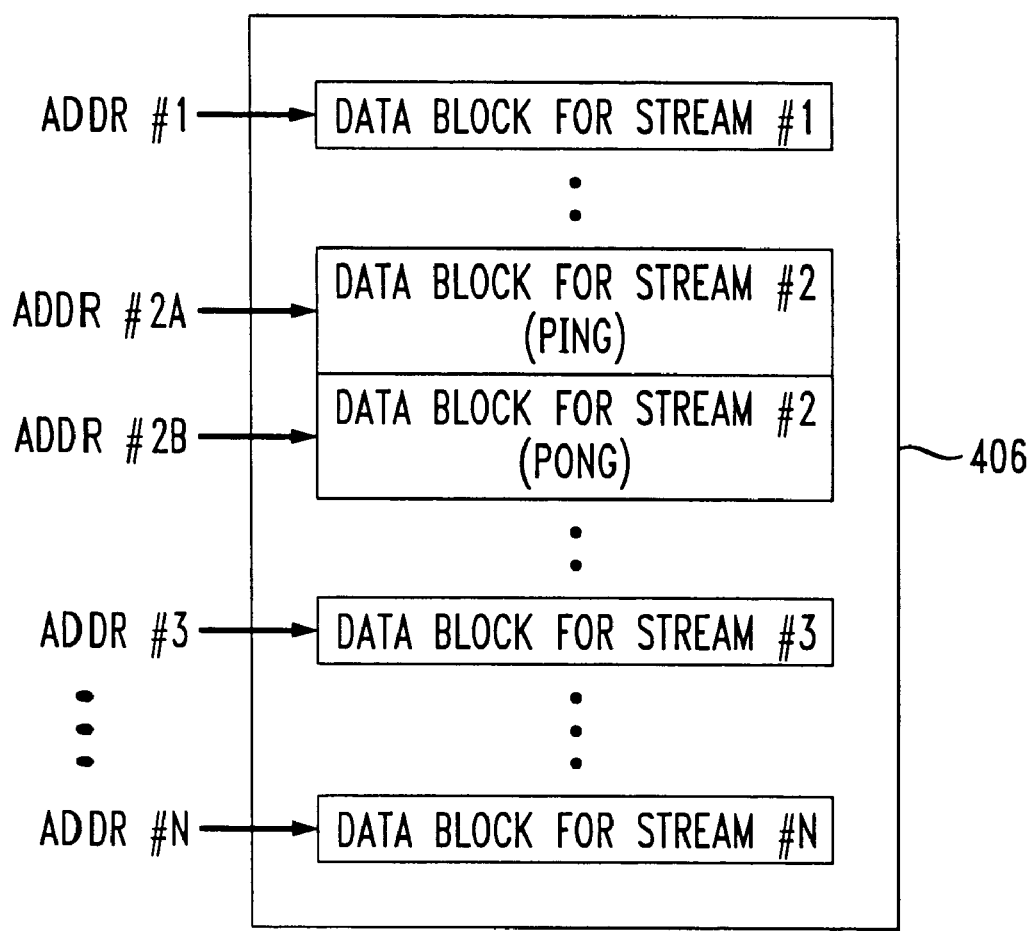
FIG. 5C shows a stream data storage block in the ODT engine shown in FIG. 4.

FIG. 5C depicts a stream data storage block 406 in the ODT engine 100 shown in FIG. 4. The stream data storage block 406 includes a plurality of data streams to be transferred.

Figure 6:
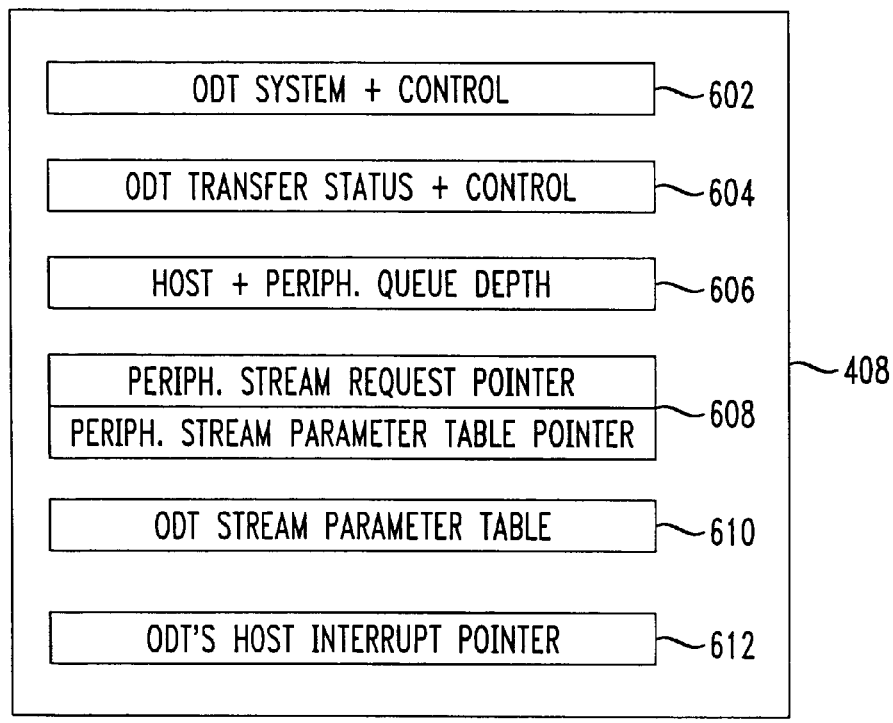
FIG. 6 shows the status and control registers of FIG. 4 in more detail.
Figure 7C:
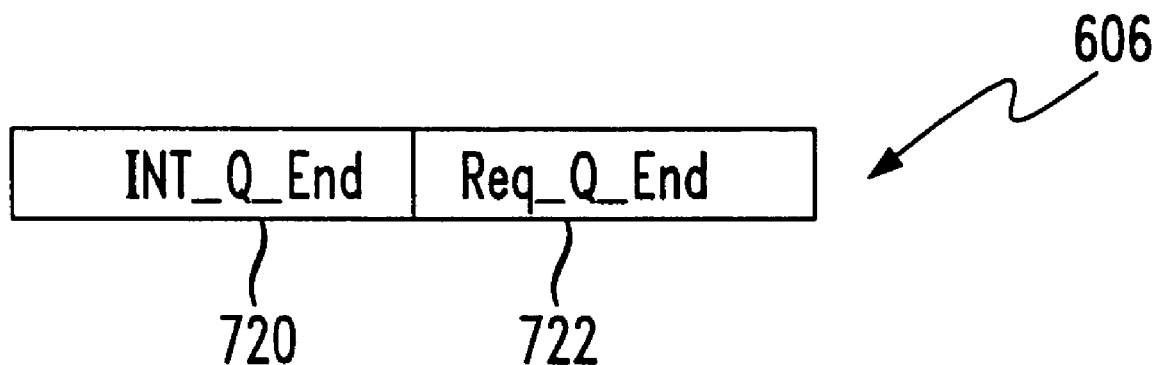
FIGS. 7C and 7C(1) show the host peripheral queue depth register of FIG. 6 in more detail.
Figure 7E:
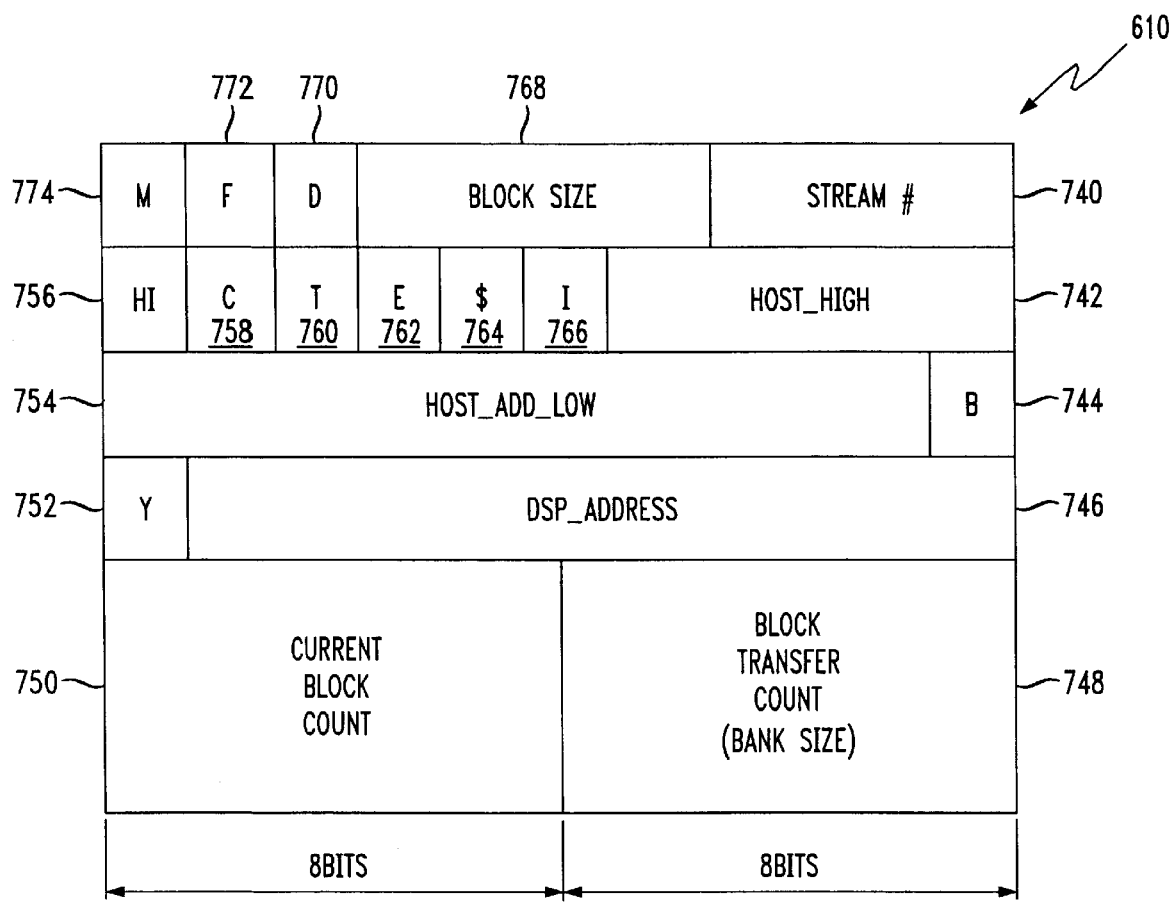
FIGS. 7E and 7E(1A), 7E(1B), 7E(1B), 7E(2A), 7E(2B) to 7E(5) show the ODT stream parameter table of FIG. 6 in more detail.

FIG. 6 depicts various status and control registers implemented in the ODT engine 100 in the embodiment shown in FIG. 4. The disclosed embodiment includes an ODT system and control register 602, an ODT transfer status and control register 604, a host and peripheral queue depth register 606, peripheral stream pointers register 608 including a peripheral stream request pointer and a peripheral stream parameter table pointer, an ODT stream parameter table 610, and the host interrupt pointer register 612. The ODT system and control register 602 is shown in more detail in FIGS. 7A, 7A(1) and 7A(2), the ODT transfer status and control register 604 is shown in more detail in FIGS. 7B and 7B(1) to 7B(5), the host and peripheral queue depth register 606 is shown in more detail in FIGS. 7C and 7C(1), the peripheral stream pointers register 608 is shown in more detail in FIGS. 7D, 7D(1) and 7D(2), the ODT stream parameter table 610 is shown in more detail in FIGS. 7E and 7E(1) to 7E(5), and the ODT's host interrupt pointer register 612 is shown in more detail in FIGS. 7F, 7F(1) and 7F(2).

A time-out event may be established with a programmable ODT timer that is under host or peripheral control. Such a timer would provide an automatic method of setting the "Go" bit in the ODT Transfer status and control register 604, e.g., every 1 usec to every 100 msec. The "Go" Bit may be automatically cleared when the ODT has sequenced through one complete pass of the Stream Request Queue.

The ODT preferably enters an idle state (e.g., goes to 'sleep') when the "Go" bit is deactivated. This provides the host and peripherals with a mechanism to determine whether any ODT engine is actively transferring data or is idle. Additionally, this scheme allows the relevant ODT transfer rate to adjust dynamically to match stream bandwidth requirements at any given time, and also saves power by reducing the number of memory accesses.

Figure 8A:
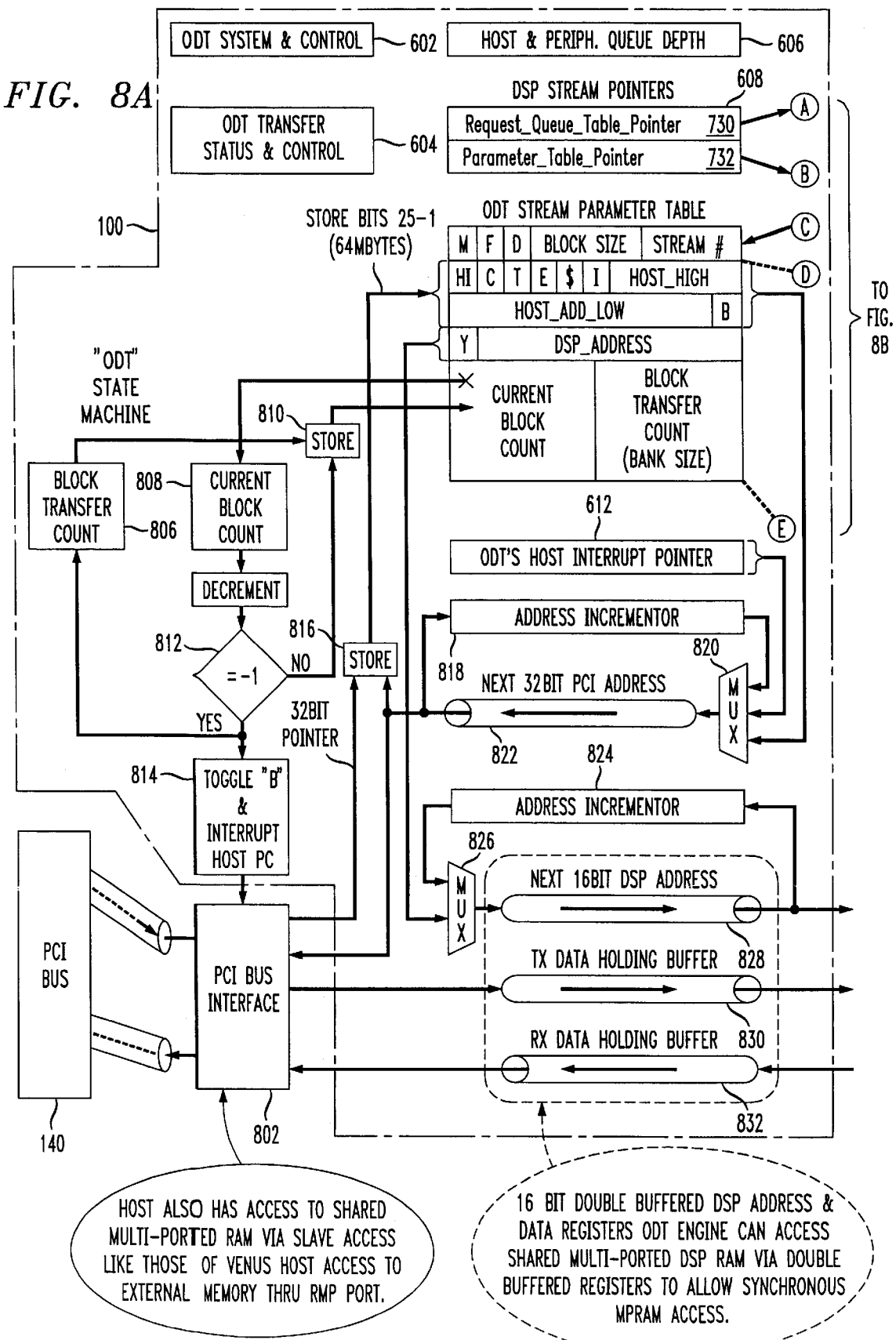
FIGS. 8A and 8B show an operative flow of register information in the disclosed ODT engine constructed in accordance with the principles of the present invention.
Figure 8B:
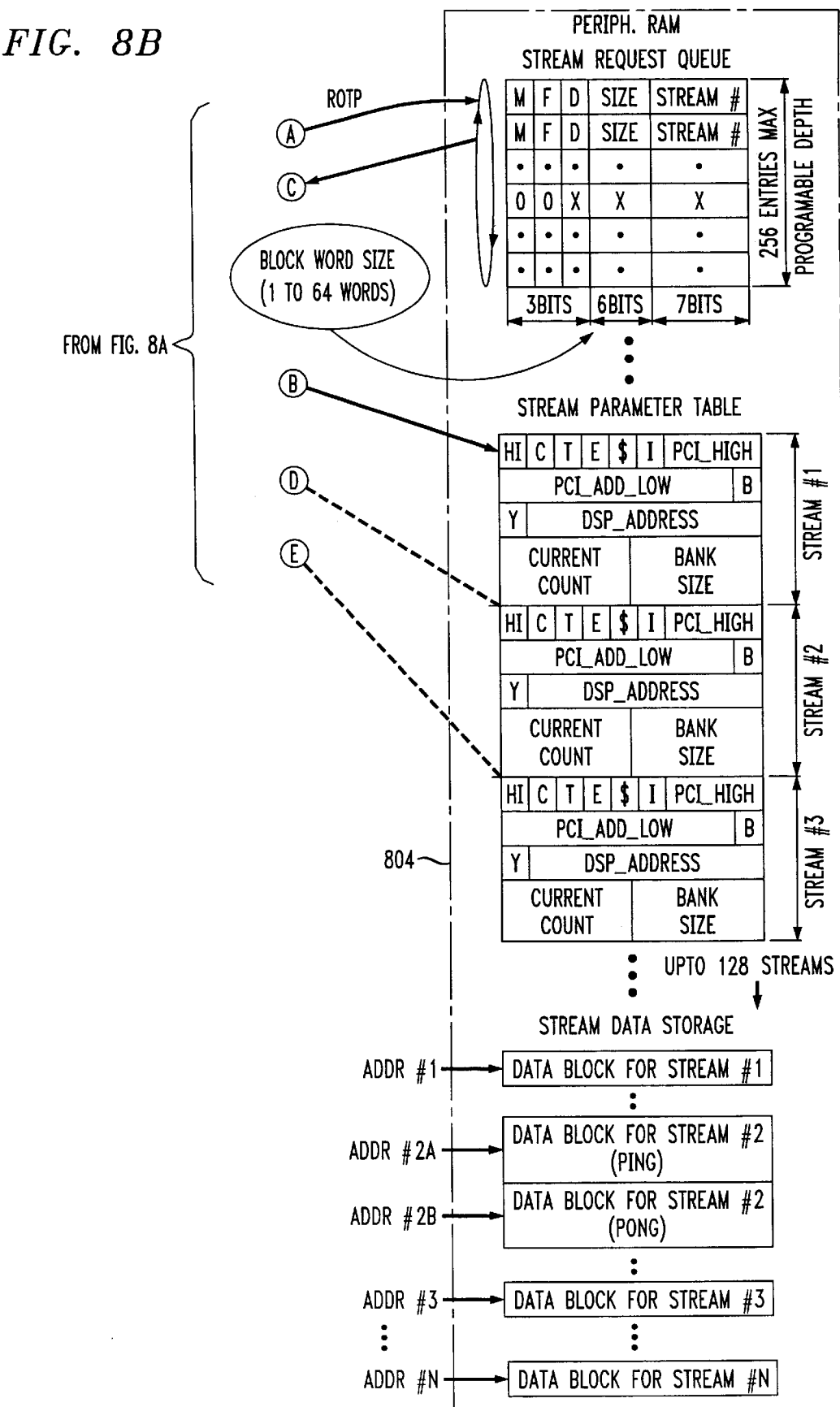

FIG. 8 shows an operative flow of register information in the disclosed ODT engine constructed in accordance with the principles of the present invention.

A specific implementation of the various registers in the ODT engine 100 are described in the following tables. It is to be understood that the specific bits, sizes, addresses and other features of the registers and memory in or relating to the ODT engine 100 may be quite different from those disclosed herein but remain covered by the principles of the present invention.

In operation, an agent or particular application will request a data stream transfer from the ODT engine 100 by programming an entry 520–524 in the Stream Request Queue (SRQ) 402. The disclosed SRQ entry 520–524 comprises a block transfer size 508, a stream ID number 510, a direction of transfer 506, a transfer request flag 504, and a host interrupt mask bit 502.

The SRQ 402 preferably has a programmable depth and is completely relocateable within the memory space of the relevant peripheral via an SRQ base address register (not shown).

Each data stream identified by a stream ID number 510 in the SRQ 402 has an associated Stream Parameter Table (SPT) 404. The SPT 404 is initialized by the requesting peripheral or host to provide the start address 542 of the data block to be transferred, and the number of data blocks 540 to be transferred. The SPT 404 is preferably located in the same memory map as the SRQ 402, and is also relocateable within the respective memory maps of the host and/or peripheral.

Thus, any device requesting a data transfer inputs an entry 520–524 in the SRQ 402 and initializes a corresponding SPT 404. Once the peripheral or host has initialized the relevant data streams for block transfers, the ODT engine 100 will be given a 'GO' command 712 (FIG. 7B) by the requesting peripheral or host to initiate the start of data transfer.

Upon receiving the GO command 712 via the ODT transfer status and control register 604 (FIG. 7B), the ODT engine 100 will monitor the SRQ 402 for a valid request. If a valid request is present in the SRQ 402, then the ODT engine 100 will fetch the corresponding SPT 404 for the data stream and complete the data transfer.

Upon completion of the single block transfer, the ODT engine 100 will update the SRQ entry 520–524 by resetting its transfer request flag in the ODT stream request queue entry 504, and will update the corresponding SPT entry 520–524 with new pointers. After going through the entire stream request queue, the ODT engine will reset its transfer request flag in the ODT transfer status and control register 604. The ODT engine 100 will also update the host address pointer 204 in the host memory 110 after each block transfer. This is a useful feature and enables the host driver to query the current position of the buffer pointer 204 relating to the requesting ODT engine 100 simply by reading a memory location in the host memory 110.

If the ODT engine 100 has reached, e.g., a half buffer mark H as shown in FIG. 3C, it will cause an entry to be made in the host's dynamic stream interrupt queue 202 and will initiate an interrupt to the host (if the interrupt is enabled). The entry 310–324 comprises the status of the interrupt 336 and the data stream ID 338.

The ODT engine 100 will continue to monitor the SRQ 402 until all the SRQ entries 520–524 are exhausted.

The requesting peripheral can request the transfer of a subsequent block of data by making another entry in the SRQ 402 and issuing a GO command 712 to the ODT engine 100.

In accordance with the disclosed embodiment, buffer pointers 204 (including the wrap-around of buffer pointers at the end of a bank) are handled by the ODT engine 100 without further involvement from the host.

Different modes can be established in the ODT engine 100 based on the needs of the particular application. For instance, the ODT engine 100 can include a code download mode allowing the transfer of up to 16 K words in a single block transfer, i.e., with one SRQ entry 520–524 and a single GO command 712.

The register definitions and operation of the ODT engine 100 are described herein with respect to a modem and audio application. The ODT engine 100 has a wide-range of applications, including but not limited to sample rate conversion, off-loading bulk delays, dynamic coefficient downloading, in-place block processing schemes, and other large block transfers of data or program code.

In general, the disclosed ODT engine 100 supports data transfers of from 1 to 128 independent data streams. Each data stream is associated with its own data storage buffer of, e.g., from 1 to 64 words. Each data stream storage block is on a word aligned boundary.

Moreover, each data stream has its own host cyclic buffer 206 in the host memory 110. Each host cyclic buffer 350, 352 (FIG. 3C) is programmable to be from 4 to 64K Bytes deep. Each host cyclic buffer 350, 352 can overlap, e.g., Direct-Sound memory allotments.

Host applications can query each data stream and determine the current position being transferred within each stream's host cyclic buffer 350, 352 without accessing the registers of the ODT engine 100 and without involvement of the peripheral supporting the memory. The current position can be determined to an accuracy of the number of words in a block.

Bus master accesses to the host system memory 110 will be 32-bit wide accesses with 26 bits of accuracy. The beginning address of the host cyclic buffer 350, 352 of each data stream is on a 4 byte aligned boundary. In the disclosed embodiment, the ODT engine 100 resides within a 64 MByte system memory space.

The ODT engine 100 supports both WORD and DWORD data size transfers across the PCI bus 140 to optimize throughput across the PCI bus 140.

The dynamic host stream interrupt queue (SIQ) 202 allows a host interrupt service routine (ISR) to independently service the ODT engine's interrupt for each data stream. Entries in the dynamic host stream interrupt queue 202 are updated by the relevant ODT engine 100.

The ODT engine 100 identifies which data stream is requesting a block transfer, and passes ODT status information through each entry 520–524 in the stream request queue 402.

The ODT engine 100 requires low host MIP overhead in servicing the individual interrupts from the various ODT engines 100a, 100b even when supporting large numbers of data stream transfers.

The ODT engine 100 provides programmable depth control for the dynamic stream interrupt queue 202 up to a maximum of, e.g., 256 word entries. The dynamic stream interrupt queue 202 allows the ODT engine 100 to recognize that the peripheral or host has requested one or more data blocks to be transferred.

Entries in the stream request queue 402 preferably provide sufficient information for the ODT engine 100 to i) identify the data stream block which has been requested for transfer; ii) identify the word size of the data stream block; and iii) identify the direction of transfer for the request. The entries 520–524 in the stream request queue 402 include a request flag bit 504 set by the requesting peripheral and monitored by the relevant ODT engine 100 to determine whether the previously requested data block has already been transferred.

The interrupts to the host 106 are preferably independently maskable to allow the requesting peripheral to make multiple entries in the dynamic stream interrupt queue 202 without requiring an actual interrupt to the host 106 to occur.

The stream request queue 402 has programmable depth control to minimize the amount of RAM required for usage by the ODT engine 100.

The ODT engine 100 supports a transparent transfer mode which allows the peripheral (e.g., including a DSP) to use host system memory as an extension of the peripheral's RAM block size without any involvement by the host 106.

Preferably, the ODT engine 100 does not generate an entry to the dynamic stream interrupt queue 202, and does not generate an interrupt to the host 106. The ODT engine 100 generates an interrupt to the peripheral when the peripheral has reached the end of each host bank, which is half the host cyclic stream buffer as shown in FIG. 3C. This implies two interrupts to the peripheral, one for read (RX) transfers and the other for write (TX) transfers.

The ODT engine 100 does not wait for the peripheral to respond to the interrupt. Instead, the interrupt to the peripheral by the ODT engine 100 would be cleared by the peripheral via a read of an ODT engine interrupt status register. In the disclosed embodiment, the ODT engine's interrupt is double buffered to prevent the peripheral from missing an interrupt event.

The ODT engine 100 allows the peripheral to control where in the data stream cyclic buffer 206 the transfer request is to occur. This implies that the peripheral can control, e.g., 26 bits of the current 32 bit stream pointer 204 used during a block transfer.

The ODT engine 100 supports the transfer of larger than 64 continuous words per stream by allowing a transfer request for the transfer of multiple blocks (1 to 64 words each) without managing any peripheral or host address pointers.

The ODT engine 100 includes an auto-increment flag bit which the peripheral would set once. This bit is used by the ODT engine 100 to indicate that the next peripheral address which will be used by the ODT engine 100 for the beginning of the next block transfer will be stored back into the peripheral's RAM as part of the Stream Parameter Table (SPT) 404. The default value of this auto-increment flag bit assumes that the peripheral is not using auto-increment mode, and that the peripheral is responsible for updating the peripheral's address if necessary.

Since this feature may be used to download agent code, e.g., DSP code, "on-the-fly", the peripheral requires an interrupt from the ODT engine 100 indicating that a set of multiple consecutive entries for a given data stream has been transferred.

All data stream transfer information is preferably grouped per stream by the ODT engine 100 in a common area in memory, i.e., in the SPT 404.

Each stream's block data storage area in memory is allowed to be allocated in independent, non-contiguous areas, i.e., stream data storage. Each stream's host cyclic buffer storage area is allocated in separate independent noncontiguous areas as well.

In accordance with the principles of the present invention, the ODT registers for the ODT engine 100 of each peripheral device are distributed among the respective peripheral devices. Moreover, the ODT registers are accessible by the host or another peripheral.

Preferably, in the ODT engine 100, maskable peripheral interrupts are established for the following:

(a) When the ODT engine 100 has detected a collision with the host 106 due to the host not clearing the HI bit 532 in the stream parameter table 404.

(b) When the ODT engine 100 has completed a stream transfer and the ODT engine 100 passes a stream ID number 718 via the ODT transfer status and control register 604. This interrupt is preferably self-cleared when the peripheral reads the ODT transfer status and control register 604.

(c) When the ODT engine 100 has detected a collision with the dynamic stream interrupt queue 202 via the MSB bit 330 (FIG. 3A) not being cleared. The host 106 must service each stream's cyclic buffer 350, 352 indicated by each entry in the dynamic stream interrupt queue 202, then clear the MSB bit 330 in the relevant entry to inform the ODT engine 100 that the host 106 has completed the relevant cyclic buffer service request.

(d) When the ODT engine 100 has detected a wait to access to the peripheral RAM 804, in which case the ODT engine 100 will generate an interrupt. This interrupt is preferably cleared by a read of the ODT transfer status and control register 604 by the peripheral.

(e) When the ODT engine 100 has detected a PCI bus event that has caused a PCI bus latency counter to time-out, or a premature termination of a PCI bus master access, either of which causes a maskable interrupt. Preferably, this interrupt is cleared by a read of the ODT transfer status and control register 604 by the peripheral.

(g) When an emergency ODT engine stop condition has occurred due to a mis-match of ODT's upper 6 Bits of the host interrupt queue pointer register 204 with the declared range of the host Interrupt queue pointer register 204. When this state has been detected, the ODT engine 100 will immediately halt and terminate a current block transfer, then cause a non-maskable (or maskable) interrupt to the peripherals and to the host 106.

A maskable interrupt may be generated for the host 106 when the ODT engine 100 has completed one or a multiple number of stream's block transfer, and ODT engine 100 will generate a maskable interrupt to the host 106. This interrupt from ODT engine 100 is intended to be used by the host 106 to manage specified stream's cyclic buffers 206. This interrupt is cleared when the host 106 reads the relevant entry in the dynamic stream interrupt queue 202.

Another maskable interrupt may be generated for the host 106 when the ODT engine 100 has detected a collision with the dynamic stream interrupt queue 202 via its MSB bit 330 not being cleared. The host 106 must service each stream's cyclic buffer 206 indicated by each entry in the dynamic stream interrupt queue 202, then clear the MSB 774 (or other designated bit) in the relevant entry to inform the ODT engine 100 that the host 106 has completed the relevant cyclic buffer service request. This interrupt is preferably cleared when the host 106 reads the dynamic stream interrupt queue 202.

Thus, in accordance with the principles of the present invention, an efficient, high capacity, flexible, and distributed block data transfer system is provided.

While the invention has been described with reference to the exemplary embodiments thereof, those skilled in the art will be able to make various modifications to the described embodiments of the invention without departing from the true spirit and scope of the invention.

What is claimed is:

1. A block memory transfer module comprising:

a start address for a block of memory to be transferred, maintained in memory of a first device; and a length of said block of memory to be transferred, maintained in memory of a second device separate from said first device;

wherein said length of said block of memory to be transferred is variable without requiring intervention by said first device.

2. The block memory transfer module according to claim 1, wherein:

said first device is a host.

3. The block memory transfer module according to claim 2, wherein:

said second device is a peripheral device including said block of memory.

4. The block memory transfer module according to claim 1, wherein:

said second device is a peripheral device including said block of memory.

5. The block memory transfer module according to claim 1, further comprising:

a burst type data transfer bus between said first device and said second device.

6. The block memory transfer module according to claim 5, wherein:

said burst type data transfer bus is a Peripheral Components Interface bus.

7. The block memory transfer module according to claim 6, wherein:

said first device is a host processor of a personal computer; and said second device is a peripheral in said personal computer.

8. A method of transferring a large plurality of blocks of data over separate data transfer channels, said method comprising:

distributing a plurality of data transfer engines among respective devices connected to a data bus, each data transfer engine including a length of a respective at least one of said plurality of blocks of data;

maintaining a centralized data buffer in a host relating to one of a source and destination of each of said plurality of blocks of data to be transferred;

transferring each of said plurality of blocks of data over a separate one of said plurality of data transfer channels based on said length of said plurality of blocks of data established by each of said distributed plurality of data transfer engines; and changing said length of said respective at least one of said plurality of blocks of data without requiring intervention by said host.

9. The method of transferring a large plurality of blocks of data over separate data transfer channels according to claim 8, said method further comprising:

maintaining a centralized start address relating to a starting address of a source of each of said plurality of blocks of data to be transferred separate from a storage device for storing said lengths of said plurality of blocks of data.

10. The method of transferring a large plurality of blocks of data over separate data transfer channels according to claim 8, wherein:

said data buffer is cyclic.

11. The method of transferring a large plurality of blocks of data over separate data transfer channels according to claim 8, wherein:

said data bus is a burst type data transfer bus.

12. The method of transferring a large plurality of blocks of data over separate data transfer channels according to claim 11, wherein:

said burst type data transfer bus is a PCI bus.

13. The method of transferring a large plurality of blocks of data over separate data transfer channels according to claim 8, wherein :

said large plurality is more than seven.

14. Apparatus for transferring a large plurality of blocks of data over separate data transfer channels, said method comprising:

a plurality of data transfer means for transferring at least one block of data, said plurality of data transfer means being distributed among a respective plurality of devices connected to a data bus, each data transfer means including a length of a respective at least one of said plurality of blocks of data;

centralized data buffer means maintained in a host for containing one of a source and destination of each of said plurality of blocks of data to be transferred;

means for transferring each of said plurality of blocks of data over a separate one of said plurality of data transfer channels based on said length of said plurality of blocks of data established by each of said distributed plurality of data transfer engines;

means for changing said length of said respective at least one of said plurality of blocks of data without requiring intervention by said host.

15. The apparatus for transferring a large plurality of blocks of data over separate data transfer channels according to claim 14, further comprising:

means for maintaining a centralized start address relating to a starting address of a source of each of said plurality of blocks of data to be transferred separate from a storage device for storing said lengths of said plurality of blocks of data.

16. The apparatus for transferring a large plurality of blocks of data over separate data transfer channels according to claim 14, wherein:

said centralized data buffer means is cyclic.

17. The apparatus for transferring a large plurality of blocks of data over separate data transfer channels according to claim 14, wherein:

said data bus is a burst type data transfer bus.

18. The apparatus for transferring a large plurality of blocks of data over separate data transfer channels according to claim 17, wherein:

said burst type data transfer bus is a PCI bus.

19. The apparatus for transferring a large plurality of blocks of data over separate data transfer channels according to claim 14, wherein:

said large plurality is more than seven.

20. A system adapted for transferring a large plurality of blocks of data over separate data transfer channels, said system comprising:

a plurality of computer devices each comprising a respective data transfer engine, each of said plurality of computer devices interconnected via a data bus, each data transfer engine including storage for a length of a respective at least one of said plurality of blocks of data; and a host computer device including a centralized data buffer relating to one of a source and destination of each of said plurality of blocks of data to be transferred, said host computer device including a starting address of each of said plurality of blocks of data;

wherein said length of said respective at least one of said plurality of blocks of data is variable without requiring intervention by said host computer device.

21. The system adapted for transferring a large plurality of blocks of data over separate data transfer channels according to claim 20, wherein:

said data bus is a PCI bus.

22. The system adapted for transferring a large plurality of blocks of data over separate data transfer channels according to claim 20, wherein:

said data bus is a burst type data bus.

* * * * *